United States Patent
Horikoshi et al.

(10) Patent No.: US 6,246,796 B1
(45) Date of Patent: Jun. 12, 2001

(54) METHOD AND APPARATUS FOR TRANSMITTING OR PROCESSING IMAGES

(75) Inventors: Tsutomu Horikoshi; Kazuhito Higuchi; Takaaki Akimoto; Satoshi Suzuki, all of Tokyo (JP)

(73) Assignee: Nippon Telegraph and Telephone Corporation (JP)

( * ) Notice: Subject to any disclaimer, the term of this patent is extended or adjusted under 35 U.S.C. 154(b) by 0 days.

(21) Appl. No.: 09/085,345

(22) Filed: May 27, 1998

(30) Foreign Application Priority Data

May 28, 1997 (JP) .................................................... 9-137372
Jan. 16, 1998 (JP) .................................................... 10-006216

(51) Int. Cl.⁷ ........................................................ G06K 9/36

(52) U.S. Cl. ............................................ 382/232; 382/248

(58) Field of Search ........................................ 382/115, 248, 382/124, 249, 240, 250, 279, 119, 135, 137, 232, 317; 358/435, 436; 359/561, 559, 560

(56) References Cited

U.S. PATENT DOCUMENTS 5,103,306 * 4/1992 Weiman et al. ...................... 358/133
5,748,780 * 5/1998 Stolfo .................................. 382/232
6,078,679 * 6/2000 Yi et al. .............................. 382/115

OTHER PUBLICATIONS

Yoshida et al. (Optical Computing Techniques for Image/Video Compression, Proceeding of the IEEE vol. 82, No. 6, pp. 948–954, Jun. 1992.*
T. Horikoshi et al., "Image Reconstruction from Digitalized CGH ", General Conference of IEICE 1998, D–11–174, Mar. 1997.

V. Markandey et al., "Digital Display System Based on the Digital Micromirror Device", Technical paper of SMPTE Journal, 680, Oct. 1995.

(List continued on next page.)

*Primary Examiner*—Jose L. Couso
*Assistant Examiner*—Duy M. Dang
(74) *Attorney, Agent, or Firm*—Pennie & Edmonds LLP

(57) ABSTRACT

The present invention provides an image transmission method employing phase/amplitude resolution processing in which three-dimensional data of an object recorded as a holographic fringe pattern by means of reference light and light from the object are transmitted sequentially, and at the receiving side, the holographic fringe patterns received are displayed sequentially and with reference to the reproduced light, and the object is displayed in a three-dimensional manner;

wherein, at the transmission side, the following processes are executed: a process in which the image of the holographic fringe pattern expressed in terms of complex numbers is decomposed into an amplitude component image and a phase component image, a process in which the high frequency component of the spatial frequency in the amplitude component image decomposed in this way is reduced, processing for converting the gradation in the phase component image is carried out, and each image is compressed and encoded after this processing, and a process in which the image data of the two components compressed and encoded in this way are separately transmitted;

while on the receiving side, the following processes are executed: a process in which the image data of the two components, which were separately transmitted, are received, a process in which the received image data are decoded sequentially into an amplitude component image and a phase component image, and a process in which the decoded amplitude component image and phase component image are again combined into a complex component and displayed.

19 Claims, 17 Drawing Sheets

OTHER PUBLICATIONS

M. Broja et al., "Stability of active binarization processes", Optics Communications, vol. 60, No. 6, pp. 353–358, Dec. 1986.

L.J. Hornbeck, "Digital Light Processing for High–Brightness, High–Resolution Applications", SPIE Proceedings, vol. 3013, Projection Display III, Feb. 1997.

R.J. Collier et al., "Optical Holography", pp. 523–541, Academic Press, 1971.

G. Deschamps, "Some Remarks on Radio–Frequency Holography", Proc. IEEE, pp. 570–571, Apr. 1967.

T. Horikoshi et al., "Computer Generated hologrphy using complex interference patterns", SPIE, Practical Holography XII, vol. 3293, pp. 30–37, 1998.

* cited by examiner

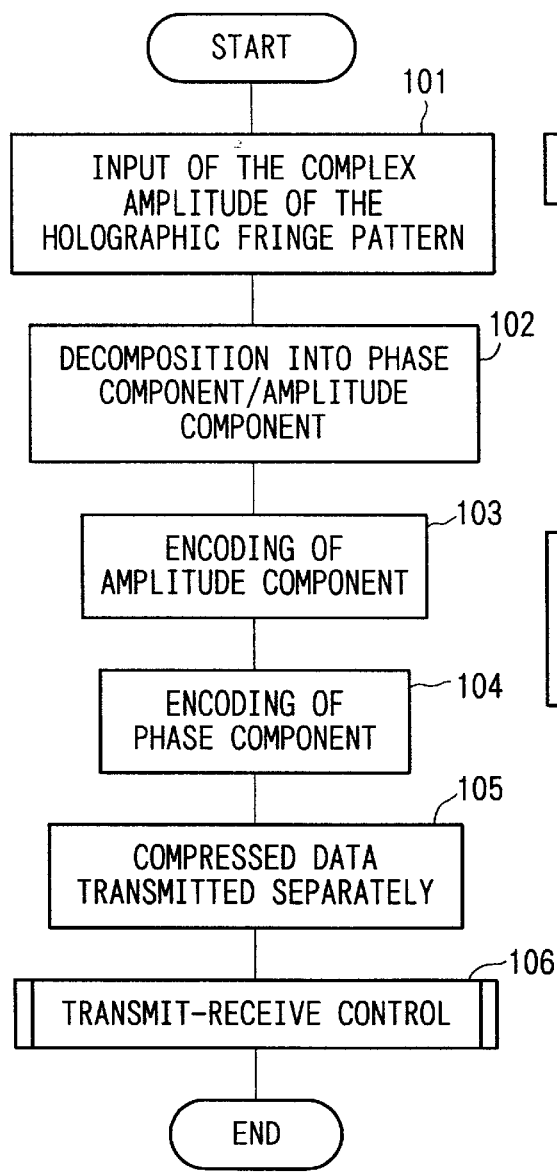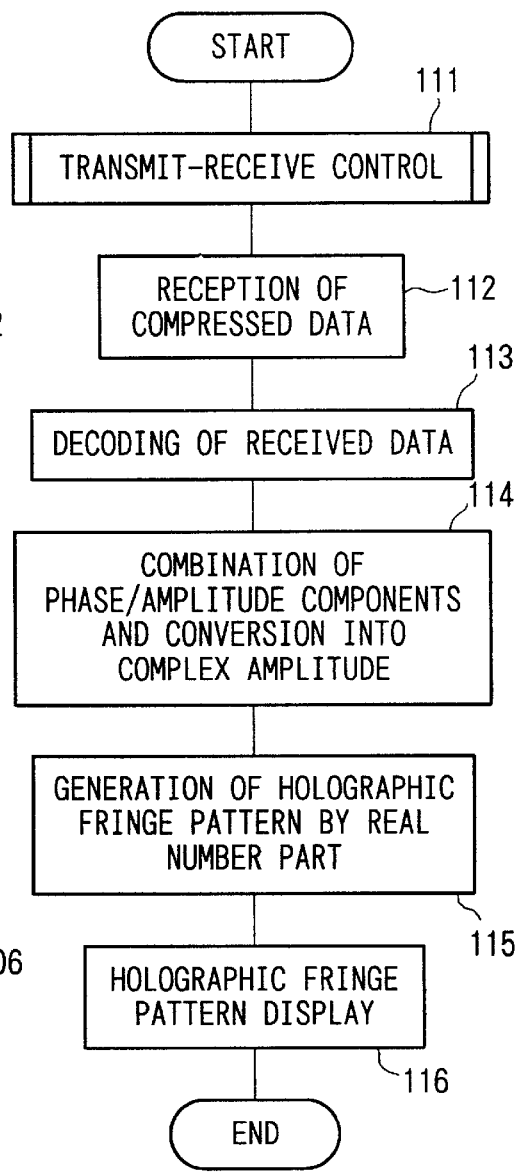

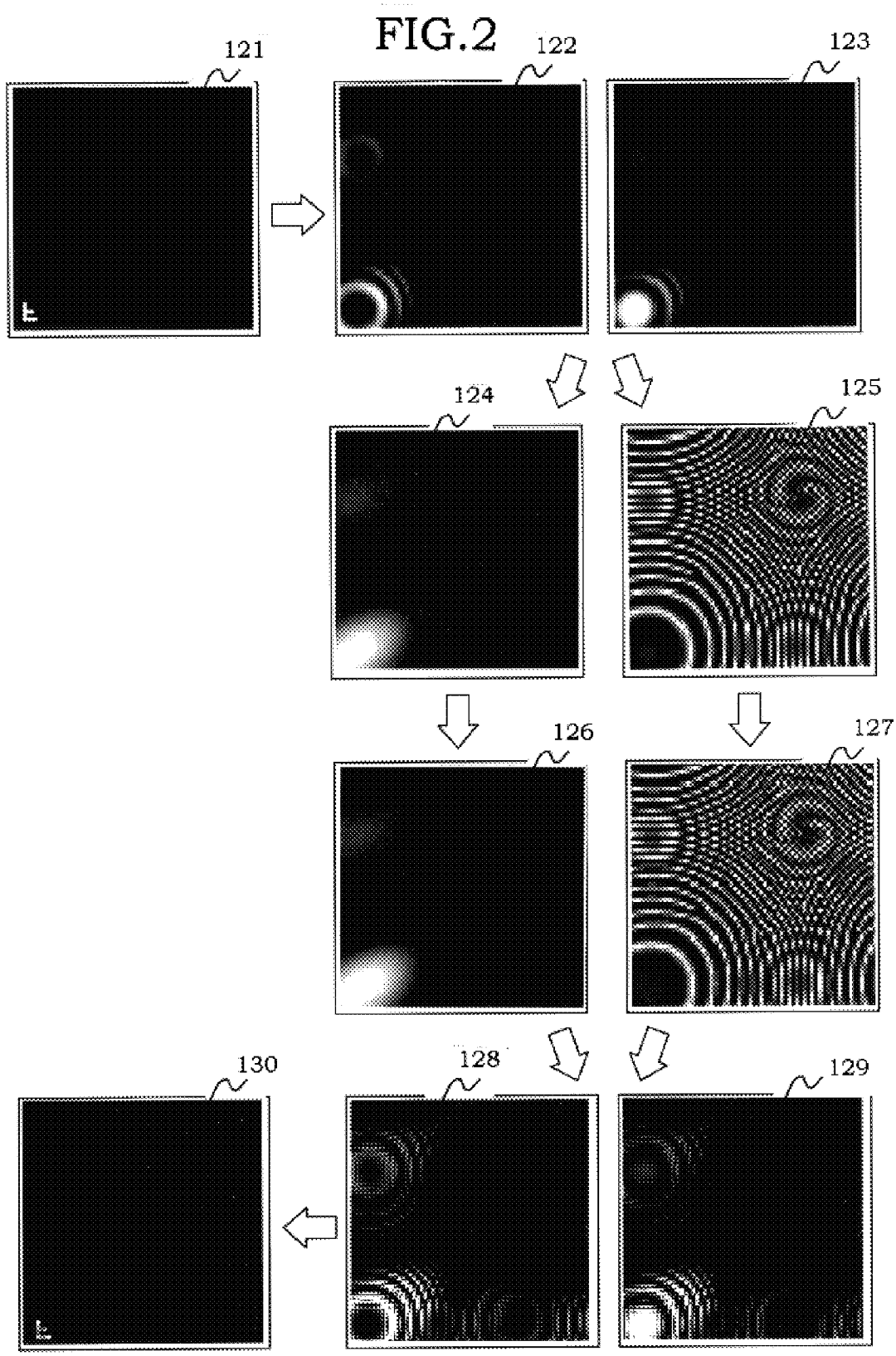

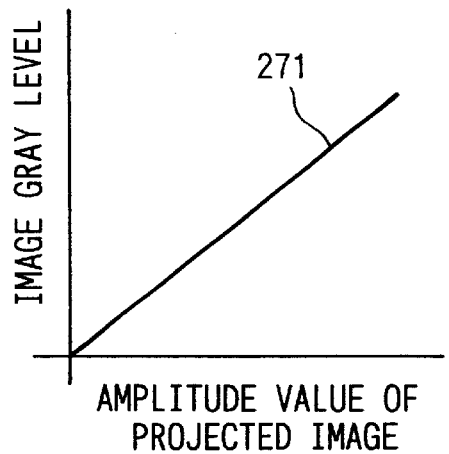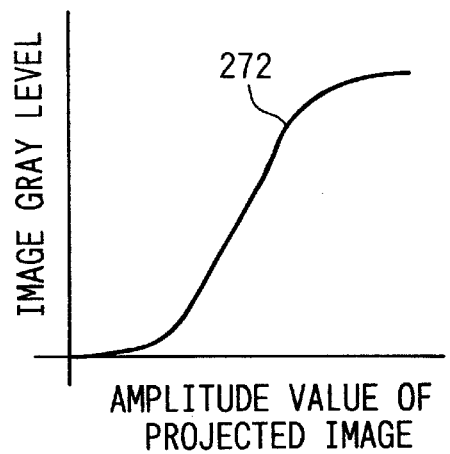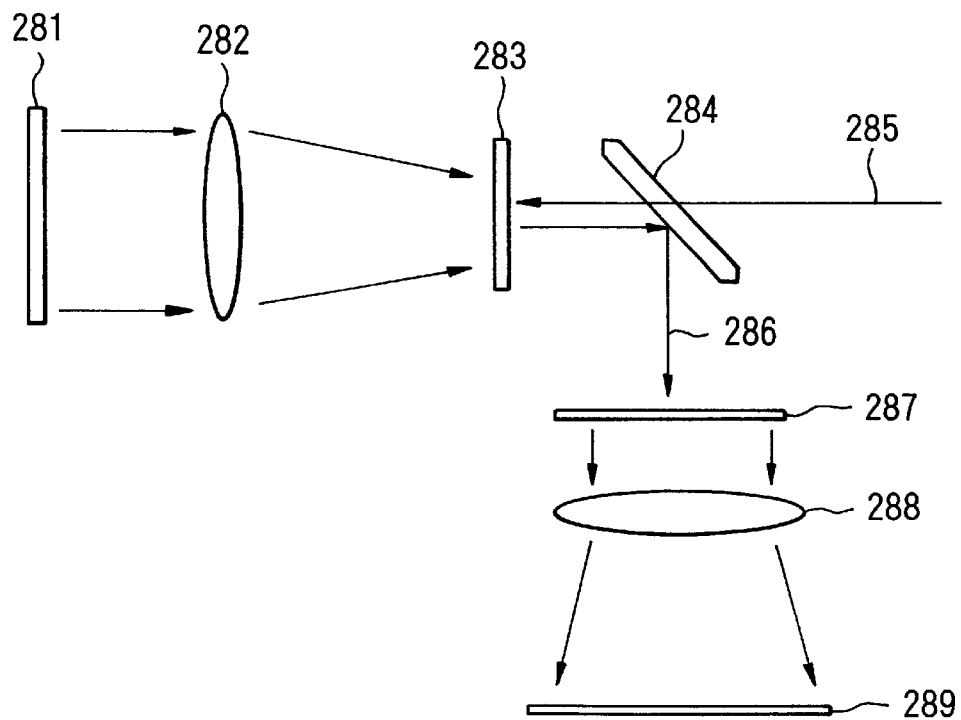

METHOD AND APPARATUS FOR TRANSMITTING OR PROCESSING IMAGES

BACKGROUND OF THE INVENTION

1. Field of the Invention

The present invention relates to technology for efficiently compressing or encoding image data or storing or transmitting these data, using holographic fringe patterns.

This application is based on patent application No. Hei 9-137372 and No Hei 10-6216 filed in Japan, the contents of which are incorporated herein by reference.

2. Description of the Related Art

Holography refers to a technique for reproducing wave fronts from physical objects by means of light diffraction. Commonly, this has developed as a method of positioning for stereoscopic photography. On the other hand, the hologram is a technique for recording optical holographic fringe patterns; these can be determined by means of calculations if the shape of a physical object to be displayed, the wavelength of reference light, and the like, are known. This has been the subject of research for a long period of time in the field of computer holograms. An important merit of such technology is that it is possible to produce a holographic fringe pattern by means of calculations even for objects which do not actually exist; the chief development of such technology has been in fields other than stereoscopic display such as optical communication devices, optical pickups for CD ROM devices, and the like.

An important feature of such holograms other than those used for stereoscopic display is the data redundancy thereof. In other words, there is little effect on the reproduced image even if a portion of the hologram is deleted. As a result, by recording three-dimensional data and image data as holographic fringe patterns, it is possible to achieve techniques which simultaneously support conventional image compression and encoding functions. However, in order to display the holographic fringe patterns as holograms, it is necessary to display the holographic fringe patterns, which contain an enormous number of pixels, in high resolution apparatuses. For this reason, commonly, it is not merely the case that the construction of display apparatuses for computer holograms is difficult, but also the amount of data required to produce the holographic fringe patterns themselves is enormous. For this reason, almost no research has been conducted into image compression/encoding technology employing such holograms.

Even if high resolution apparatuses have been realized as a result of recent developments in electrical display technology, the problem still remains that the amount of data corresponding to an image (a holographic fringe pattern) is enormous. For example, in the case of a 5 inch screen, approximately 8 G pixels or more are required to display a hologram. In contrast, HDTV requires about 2 M pixels, so that approximately 4,000 times the amount of data is required for one image. Conventionally, even if large capacity transmission technologies employing optical fibers or the like were established, the data compression technologies involved constitute difficult problems.

SUMMARY OF THE INVENTION

The present invention was created in light of the above problems; it has as an object thereof the savings of transmission capacity during the transmission of three-dimensional image data realized by means of complex amplitudes.

For this reason, the present invention provides an image transmission method in which three-dimensional data of an object recorded as a holographic fringe pattern by means of reference light and light from the object are transmitted sequentially, and at the receiving side, the holographic fringe patterns received are displayed sequentially and with reference to the reproduced light, and the object is displayed in a three-dimensional manner; wherein, at the transmission side, the following processes are executed: a process in which the image of the holographic fringe pattern expressed in terms of complex numbers is resolved into an amplitude component image and a phase component image, a process in which the high frequency component of the spatial frequency in the amplitude component image resolved in this way is reduced, processing for converting the gradation in the phase component image is carried out, and each image is compressed and encoded after this processing, and a process in which the image data of the two components compressed and encoded in this way are separately transmitted; while on the receiving side, the following processes are executed: a process in which the image data of the two components, which were separately transmitted, are received, a process in which the received image data are decoded sequentially into an amplitude component image and a phase component image, and a process in which the decoded amplitude component image and phase component image are again combined into a complex component and displayed; the present invention also provides a recording medium for recording image transmission programs which permits the processes above to be executed by a computer.

Furthermore, an apparatus for the transmission of images by means of phase/amplitude processing which is provided with, on the transmission side, a section for inputting complex amplitude holographic fringe pattern images, a section for resolving the holographic fringe pattern images into a phase component image and an amplitude component image, a section for conducting image processing which reduces the high frequency component of the spatial frequency in the amplitude component image result which was resolved in this manner, a section for conducting image processing which executes gradation conversion of the phase component image which was resolved in this manner, and a section for compressing and encoding the component images subjected to image processing in this manner, are provided, and which is provided with, on the receiving side, a section for decoding the compressed and encoded image data into a phase component image and an amplitude component image, and a section for synthesizing the decoded phase component image and amplitude component image into a complex amplitude image, is provided.

In this way, by conducting processing which preserves the characteristic features of the phase component image and the amplitude component image, it is possible to reduce the redundant portion, and it is possible to further increase the compression ratio during transmission without negatively affecting the image quality of the reproduced image.

Furthermore, the present invention has as an object thereof, in view of the above points, the efficient encryption of three-dimensional or two-dimensional image data using holographic fringe patterns.

For this reason, the present invention provides a method for storing or processing images in which image data are converted, wherein are provided: a process in which three-dimensional or two-dimensional image data are set in a certain spatial position, and by referring to reference light specific to the image and producing a projected image by means of light passing through the image or reflected light, an image is obtained having complex amplitude values, and a process in which two types of images, in which each pixel of the projected image having a complex amplitude value thus determined is resolved into a real number part and an imaginary number part, and the calculation parameters for producing the projected image, are stored or transmitted; the present invention also provides a recording medium for recording image processing programs which permit the processes described above to be executed by a computer.

Furthermore, an image processing apparatus is provided which is provided with: an image conversion section for producing the projected image of an inputted image using prespecified calculation parameters, a section for determining the calculation parameters, and one or both of a section for storing the projected image and the calculation parameters, and a section for transmitting the projected image and the calculation parameters.

By means of this, it is possible to realize the transmission, reception, and storage of image data which are encrypted with a high degree of security.

Furthermore, in light of the above circumstances, the present invention has as an object thereof a reduction in the amount of data in images in which a plurality of holographic fringe patterns have been digitalized.

For this reason, the present invention provides an image processing method for producing multiplex images in which a plurality of images are multiplexed, wherein are provided: a process for selecting one image from among a plurality of digitalized digital images which are the subject of multiplexing processing, which images relate to holographic fringe patterns resulting from reference light and light from an object, a process for storing only the more significant bits up to a preset position in the selected image, and a process for allocating more significant bit data of images other than the selected image to positions corresponding to the least significant non-stored bits of the pixels of the selected image; the present invention also provides a recording medium for storing image processing programs which permit the above processes to be executed using a computer.

Furthermore, an image processing apparatus is provided which is provided with: an image input section for inputting a plurality of digitalized digital images which are the object of multiplexing processing, which images relate to holographic fringe patterns resulting from reference light and light from an object; a frame memory which serves as an operating memory during the production of multiplexed images; a image storage section for storing the plurality of images inputted into the image input section; an image bit allocation determination section which stipulates the bit substitution method so that the more significant bits of each pixel of the plurality of images are stored; and an image bit operating section which conducts operations on the bit series of each pixel of the images based on each bit substitution method determined by the image bit allocation determining section, and produces a multiplexed image in the frame memory.

By means of this, it is possible to achieve a reduction in the amount of data resulting from the multiplexing of images in which a plurality of holographic fringe patterns are digitazed.

BRIEF DESCRIPTION OF THE DRAWINGS

FIGS. 1A and 1B are flow charts showing the procedure on the transmission side and the procedure on the receiving side in a first embodiment.

FIG. 2 shows concrete examples of inputted images and holographic fringe patterns.

FIGS. 11A and 11B show the conversion method of the projected image and the image gray level.

FIG. 12 shows an embodiment of a system structure block which serves to optically display a projected image.

DESCRIPTION OF THE PREFERRED EMBODIMENTS (First Embodiment)

In the present embodiment, the explanation centers on an image processing method and apparatus in which data compression processing appropriate to an amplitude component and a phase component is carried out with respect to complex amplitude holographic fringe patterns in order to display a hologram, and these are transmitted.

Hereinbelow, this embodiment of the present invention will be discussed in detail based on the figures.

FIG. 1A and FIG. 1B are flow charts showing an embodiment of the method of the present invention; FIG. 1A shows the procedure on the transmission side, while FIG. 1B shows the procedure on the receiving side. In the following explanation, the hologram of the object to be displayed is successively generated, and is then inputted as a complex amplitude holographic fringe pattern.

The image shown by reference 121 in FIG. 2 was employed as an example of a object to be displayed. This example involves a two-dimensional image; however, since the processing with respect to a generated holographic fringe pattern is identical whether the object is in two dimensions or three dimensions, it is possible to use image 121 to explain the case in which the object to be displayed is a three-dimensional object as well.

At the transmission side, first, a holographic fringe pattern described in terms of complex amplitudes is inputted (step 101). References 122 and 123 in FIG. 2 indicate the real number component A (x,y) (122) and the imaginary number component B (x,y) (123) of the holographic fringe pattern (complex amplitude) I (x,y)=A (x,y)+iA (x,y) relating to the inputted image 121.

Next, since it is possible to express the holographic fringe pattern expressed in terms of this complex amplitude component in the following manner:

$$I(x,y)=c(x,y)e^{i\phi(x,y)},$$

this is decomposed into a phase component $\phi(x,y)$ and an amplitude component $c(x,y)$ (step 102). Reference 124 in FIG. 2 shows a display of the amplitude component $c(x,y)$, while reference 125 in FIG. 2 shows a display of the phase component $\phi(x,y)$. These images are shown with 256 gray-scale gradations.

Figure 3:
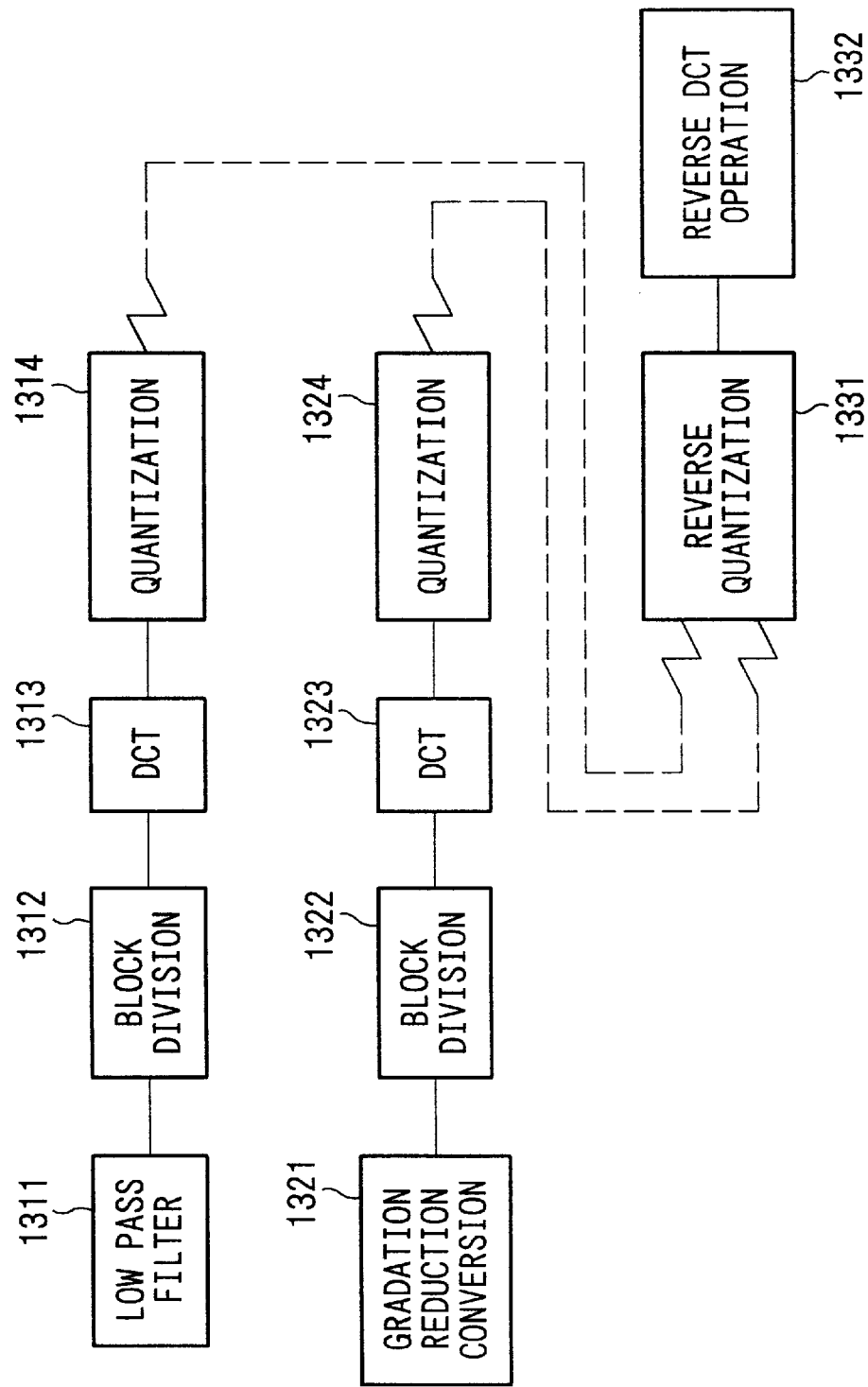
FIG. 3 shows a concrete example of the encoding/decoding processing in the embodiment described above.

Next, processing which serves to compress and encode each component is applied. First, the order of the compression processing of amplitude component $c(x,y)$ is shown in FIG. 3. Initially, low pass filter processing is conducted as a form of preprocessing (1311), and after low pass filter processing, the image is divided into blocks (1312), each of the blocks is subjected to discrete cosine transformation (1313), and quantization processing (1314) is applied using a quantization table (step 103), and compressed data are thus generated. The image after filtering processing is shown by reference 126 of FIG. 2.

Since the amplitude component image is fuzzy overall (it is an image which incorporates a large number of components having low spatial frequencies), there is almost no decline in image quality of the reconstituted image as a result of the application of a low pass filter. Furthermore, since the spatial frequency is low, by using a quantization table from which a considerable amount of the high frequency components have been eliminated, it is possible to further increase the compression ratio.

Furthermore, with respect to the phase component, gradation processing (1321) is first applied. This component image has 256 gradations, so that each pixel may be expressed in terms of eight bits. This is converted, for example, into an image having a four-bit gradation. The phase component image contains data relating to the form of the object (or the outline of the texturing or the like), and in comparison with gray level data, the gaps in the pattern constitute important data. For this reason, as an extreme example, it is possible to employ a binary image. Next, block division of the gradation-converted image (1322), a discrete cosine transformation (1323), and quantization by means of a quantization table (1324) are conducted (step 104) and compressed data are generated. The image after gradation processing is shown by reference 127 in FIG. 2.

The high spatial frequency is important in the phase component. Accordingly, when a phase component which has been subjected to gradation reduction processing (1321) is to be frequency-converted and quantized, a quantization table is employed such that little of the high frequency component is lost.

Furthermore, in order that the processing applied with respect to the phase component preserve the high spatial frequency thereof in place of the processing (1322–1324) of the phase component which has been subjected to gradation reduction processing (1321) by frequency conversion and quantization, reversible compression by means of Hoffman coding or the like may be carried out. In such a case, in the processing shown by the references 1331 and 1332 described hereinbelow, a phase component will be realized, the gradations of which have been reduced and which has been reversibly compressed.

Then, the compressed data of images 126 and 127 of FIG. 2 are transmitted separately (step 105). The order of transmission and reception on the reception apparatus side which is employed is specific to each apparatus (steps 106 and 111).

The above processing is carried out in order each time a new holographic fringe pattern is inputted.

At the receiving side, when the compressed data are received (step 112), first, decoding processing is carried out (step 113). Images 126 and 127 are generated, that is to say, the transmitted compressed data are subjected to reverse quantization (1331), and a reverse DCT operation (1332), and thereby, the phase component and amplitude component images are produced. Then, the two component images are again converted into a complex amplitude component and an image is generated (step 114). Reference 128 in FIG. 2 shows an example of an image displaying the real number component of the complex amplitude, while reference 129 in FIG. 2 is an example of an image displaying the imaginary number component of the complex amplitude.

By applying reproducing light to the converted image, it is possible to reproduce an image such as that shown in reference 130 of FIG. 2 (steps 115 and 116).

Figure 4:
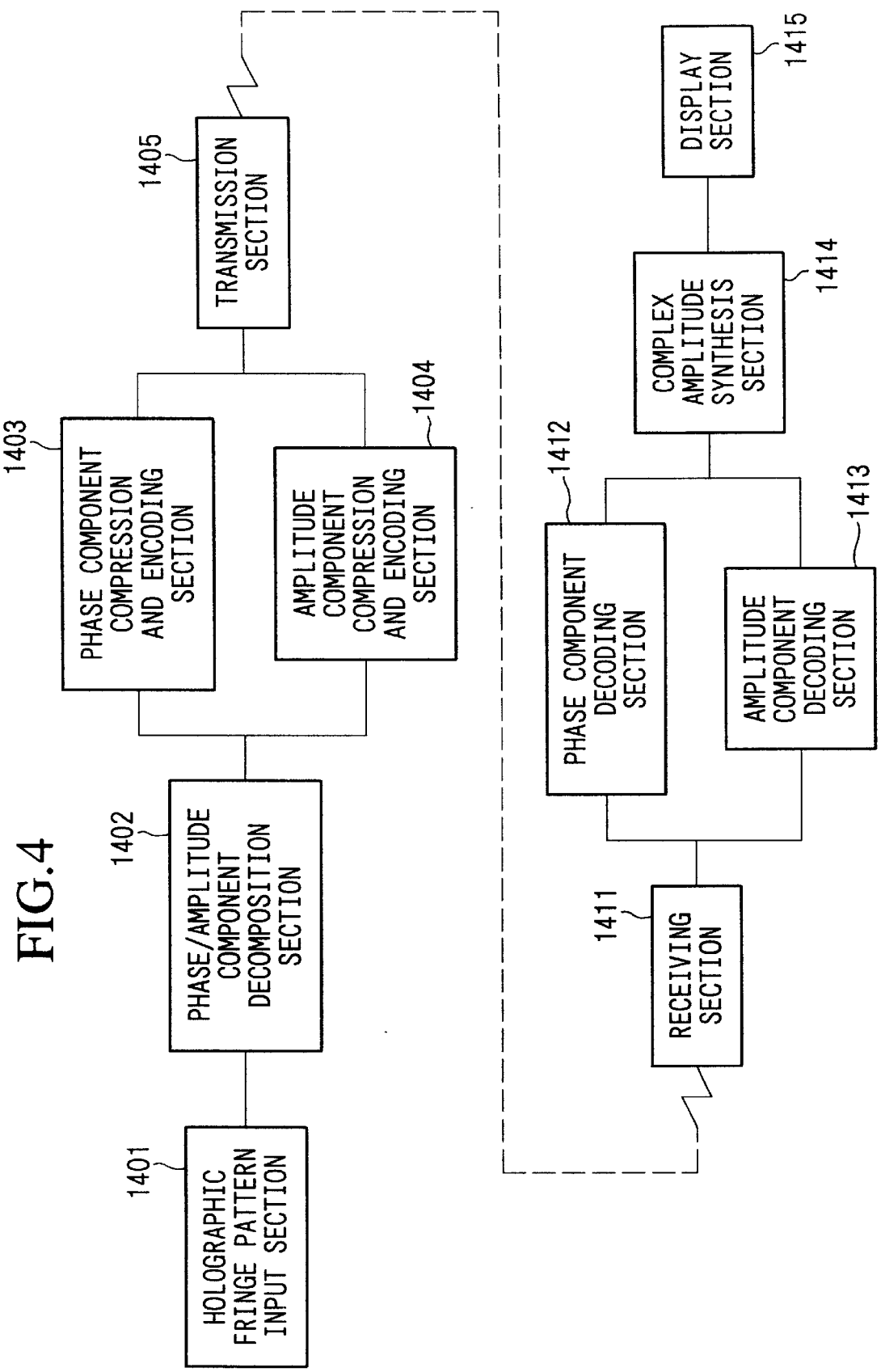
FIG. 4 is a block diagram showing a structural example of a apparatus in accordance with the present invention.

Next, examples of the structure and operation of a three-dimensional image transmission apparatus in accordance with the present invention having the characteristic parts described above will be discussed. FIG. 4 is a block diagram which serves to explain an embodiment of an apparatus of the present invention.

In the figure, reference 1401 indicates a holographic fringe pattern input section, reference 1402 indicates a phase/amplitude component decomposition section, reference 1403 indicates a phase component compression and encoding section, reference 1404 indicates an amplitude component compression and encoding section, and reference 1405 indicates a transmission section; these parts form the transmission side. Furthermore, reference 1411 indicates a receiving section, reference 1412 indicates a phase component decoding section, reference 1413 indicates an amplitude component decoding section, reference 1414 indicates a complex amplitude synthesis section, and reference 1415 indicates a display section; these parts form the receiving side. An example of the operation of the apparatus having the structure described above will be given hereinbelow.

At the transmission side, the holographic fringe patterns inputted by holographic fringe pattern input section 1401 are decomposed into a phase component and amplitude component by phase/amplitude component decomposition section 1402.

The phase component is subjected to encoding and compression processing by phase component encoding section 1403. The amplitude component is subjected to encoding and compression processing by amplitude component encoding section 1404. The two types of processing described above are conducted in parallel, and the compressed data are transmitted in transmission section 1405.

At the receiving side, the compressed phase component data and amplitude data received by the receiving section 1411 are subjected, at receiving section 1411, to classification in which the header and the like of the data is detected, and the individual components are transmitted to the decoding processing section. The compressed phase component data are converted into the original phase component image from the compressed data by phase component decoding section 1412. Furthermore, the compressed amplitude component data are also converted to the original amplitude component image from the compressed data by amplitude component decoding section 1413.

Additionally, at complex amplitude synthesis section 1414, the two component images are converted into a complex amplitude image, and this is displayed as a hologram in display section 1415.

By adopting a control method such as that described above, encoding which is appropriate for the characteristic features of the various component images is applied, so that it is possible to realize a higher compression ratio than that realized in the conventional compression of complex amplitudes.

In the present embodiment, gradation processing was employed as preprocessing prior to the encoding of the phase component; however, the method of this gradation processing is not limited to a method which involves a reduction from 8 bits to 4 bits. Furthermore, the preprocessing is not limited to gradation processing; any processing may be conducted insofar as it preserves the spacing pattern in the pattern, and no restriction is made with respect to the type of image processing.

Furthermore, in the present embodiment, a low pass filter was employed as the preprocessing of the encoding of the amplitude component; however, any processing may be employed insofar as it preserves the low frequency component of the spatial frequency, and no restriction is made with respect to the contents of such processing.

Furthermore, in the present embodiment, a discrete cosine transformation and quantization processing were employed as the encoding processing; however, many other such types of processing, such as fractal transformation or the like, are possible, and this is not limited in the present embodiment.

Furthermore, in the present embodiment, the explanation made no distinction with respect to moving regions and static regions; however, every time the inputted holographic fringe pattern is refreshed, refreshed compressed data are transmitted, and it is possible to observe the images at the receiving side as moving images. For this reason, many other methods having different compressed data transmission procedures are possible. For example, in the case of images having a number of moving regions, a method in which transmission is applied only once per three amplitude component frames, or a method in which, in the case of images in which only the illuminating light changes, transmission is applied once per three phase control image frames, or the like, are possible in which the transmission procedure/period of the phase and amplitude component images are altered based on the contents of the frame count and images to be displayed.

The light wave fronts are expressed in terms of complex numbers, and the holographic fringe patterns, which arise from the overlaying of a plurality of wave fronts, are also expressed as complex numbers. Accordingly, the components of the holographic fringe patterns may be decomposed into an amplitude component and a phase component. The amplitude component contains data reflecting characteristic features of the object, such as intensity and color and the like, while the phase component contains data reflecting the characteristic features such as position, shape, and the like.

In a method in which the holographic fringe pattern image data are simply compressed, encoded, and transmitted, the gray level (contrast) of the high frequency component is low, so that as a result of the compression processing, the high frequency component is likely to be cut, and there is a large decline in the quality of the reproduced image.

In the image transmission method in accordance with the present embodiment described above, a holographic fringe pattern image produced as a complex component image is decomposed into an amplitude component image and a phase component image, and image processing is applied with respect to the decomposed amplitude component image in which the high frequency component of the spatial frequency is eliminated, while image processing is applied with respect to the phase component image in which gradation conversion, such a reduction in the number of shades, is conducted, and after image processing, each component image is compressed, encoded, and separately transmitted, while at the receiving side, the image data of each component received are decoded into an amplitude component image and a phase component image, the complex component image is again synthesized, and this is displayed.

Furthermore, at the sending side, the transmission procedure or transmission period of the image data of the phase component and the amplitude component is altered in accordance with the type of holographic fringe pattern image (for example, images having a large number of moving regions, images in which only the illuminating light changes, and the like).

Furthermore, the image transmission apparatus of the present embodiment is provided with, at the transmission side, a section for inputting complex amplitude holographic fringe pattern images, a section for resolving the holographic fringe pattern images into a phase component image and an amplitude component image, a section for conducting image processing which carries out an elimination of the high frequency component of the spatial frequency with respect to the decomposed amplitude component image, a section for image processing which carries out gradation conversion processing with respect to the decomposed phase component image, and a section for compressing and encoding each component image subjected to such image processing, and is provided with, on the receiving side, a section for decoding the image data compressed and encoded in this manner into a phase component image and an amplitude component image, and a section for synthesizing a complex amplitude image from the phase component image and the amplitude component image decoded in this manner.

The human eye is more sensitive to shapes than to colors and the like, so that the loss of amplitude data has less effect on the visual impression in terms of a decline in image quality than the loss of phase data, so that it is possible to increase the compression ratio of the amplitude component of the holographic fringe pattern image data by means of encoding processing in which processing is applied by means of a low pass filter or like and the high frequency component is cut; the spacings and patterns in the pattern are important in the phase data, so that the gray values of the pattern are not as important, and it is possible to increase the compression ratio by means of applying encoding processing with respect to the phase component in which the number of gray scale gradations is reduced. By means of this, it is possible to realize transmission with a smaller capacity than in the case of transmission in which the complex amplitude data themselves are transmitted.

Furthermore, by means of altering the transmission order or transmission period, it is possible to emphasize the phase component in transmissions in which the image has a large number of moving regions, and to emphasize the amplitude component in the transmission of images in which only the illuminating light changes, thus achieving a savings in transmission capacity.

As described above, in accordance with the present embodiment of the present invention, by applying preprocessing which preserves the characteristic features of the phase component image and the amplitude component image, it is possible to eliminate the redundant parts, and to further increase the compression ratio without sacrificing image quality of the reproduced image.

(Second Embodiment)

In the present embodiment, an explanation will be given with respect to an image processing method and apparatus in which holographic fringe patterns having complex amplitudes determined by means of calculations are decomposed into a real number part component and an imaginary number part component with respect to each pixel, and these two images are separately encrypted, and various setting conditions parameters are used as encryption keys during the production of the holographic fringe pattern.

This embodiment of the present invention will be explained in detail based on the figures.

Figure 5:
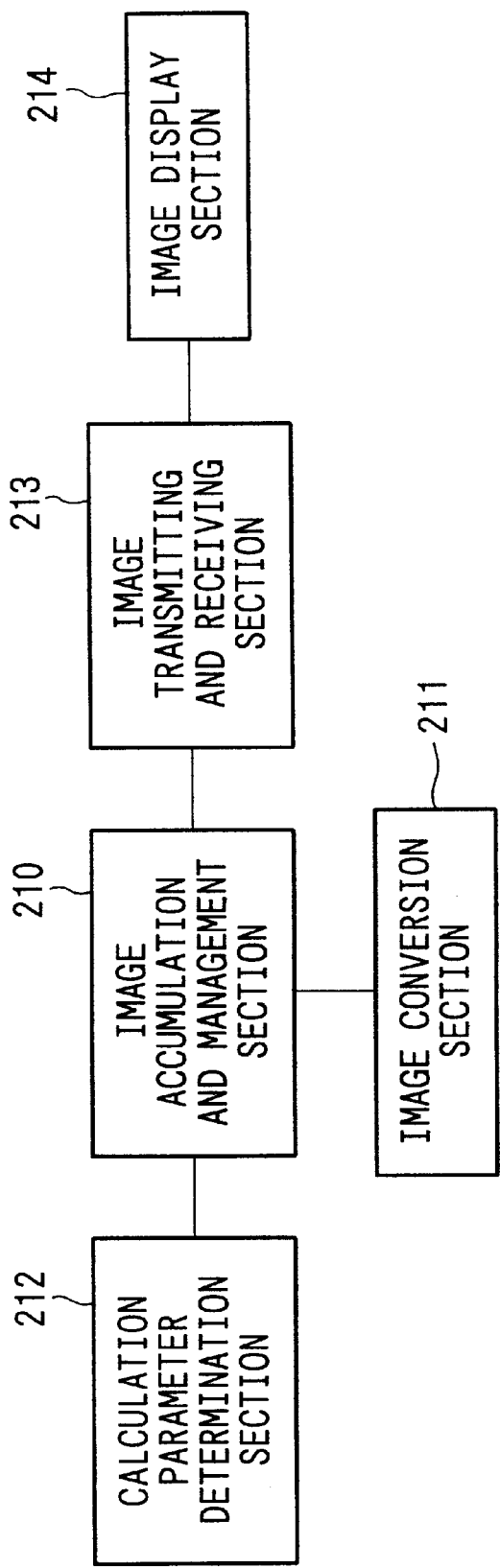
FIG. 5 is a block diagram showing the basic structure of a apparatus in accordance with the second embodiment.

In FIG. 5, an embodiment of a basic system structure of the present invention is shown. As shown in FIG. 5, the present embodiment comprises an image accumulation and management section 210, an image conversion section 211, a calculation parameter determining section 212, a image transmitting and receiving section 213, and an image display section 214. Hereinbelow, this will be explained as a structure which incorporates a side which converts the images and stores or transmits them (hereinbelow termed the transmitting side), and a side which reconstitutes and displays the stored or transmitted images (hereinbelow referred to as the receiving side).

In image accumulation and management section 210, the generated or received projected images or calculation parameters are stored, and in image conversion section 211, various types of image processing are applied in accordance with the image of the object to be displayed, or image conversion processing such as encryption or the like is conducted. Concretely, at the transmission side, the projected images of inputted images are calculated using special calculation parameters, and at the receiving side, the original image (the projected image) is reproduced using the projected images and calculation parameters received. In the calculation parameter determining section 212, calculation parameters for calculating the projected image at the transmission side are determined.

In image transmitting and receiving section 213, in the case of a stand-alone system, sections which control the input and output of images are present between the image accumulation and management section 210 and the image display section 214, and in the case in which the transmission side and the receiving side are connected via a network, an image sending and receiving function is present. Image display section 214 displays images in accordance with the image data of the reproduced projected image.

Figure 6A:
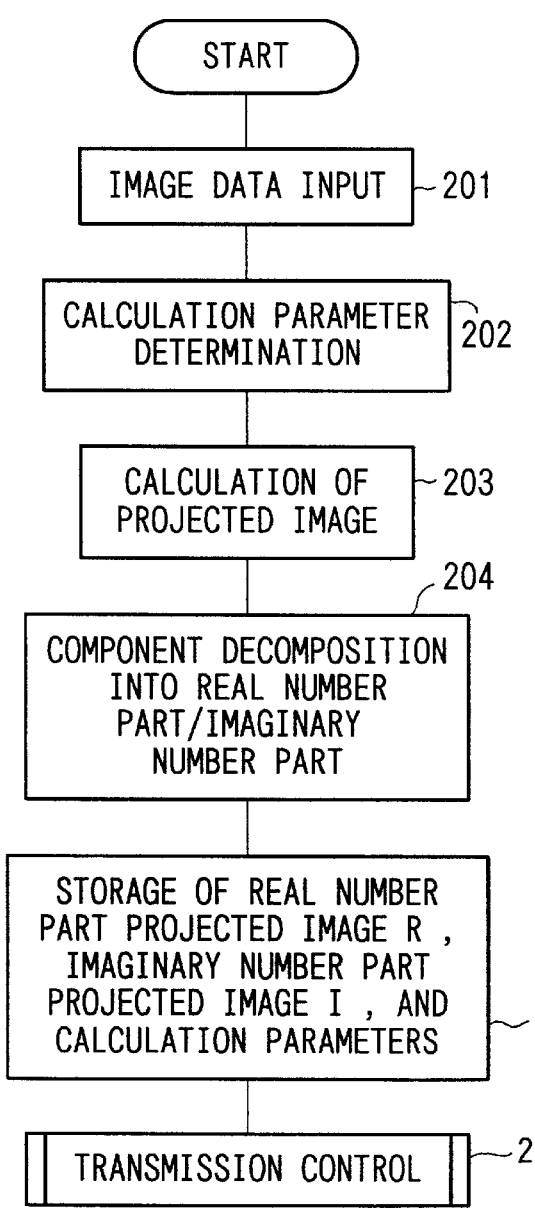
FIGS. 6A and 6B are flow charts showing the basic order of processing in the second embodiment.
Figure 6B:
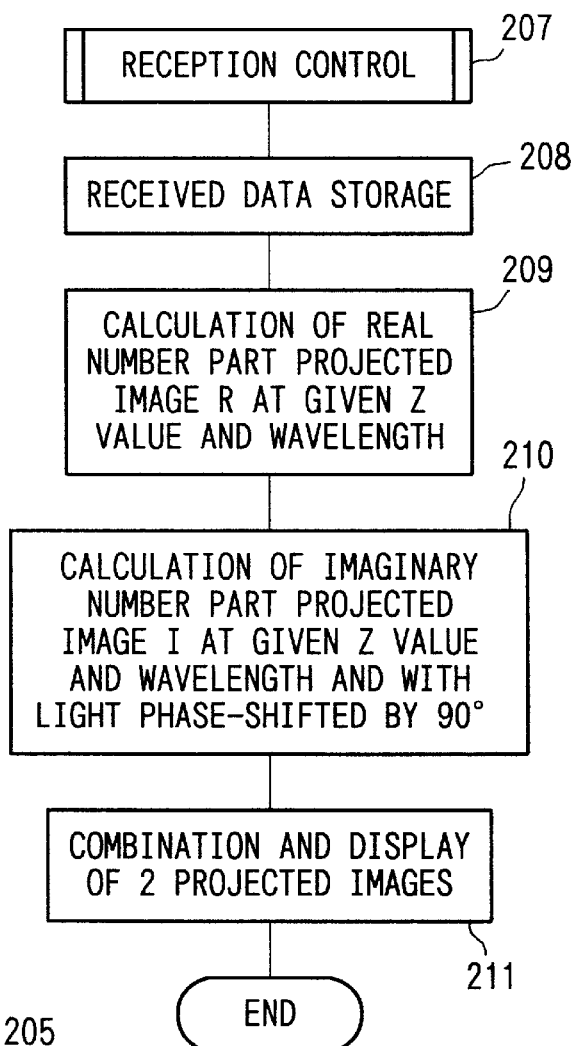

A concrete example of the functioning (processing) in which these parts function in a connected manner is shown in the flow charts of FIGS. 6A and 6B.

A concrete example employing Fresnel projection, which is one concrete example of the calculation of the projected image, will be explained as a first example of the present invention.

Figure 7A:
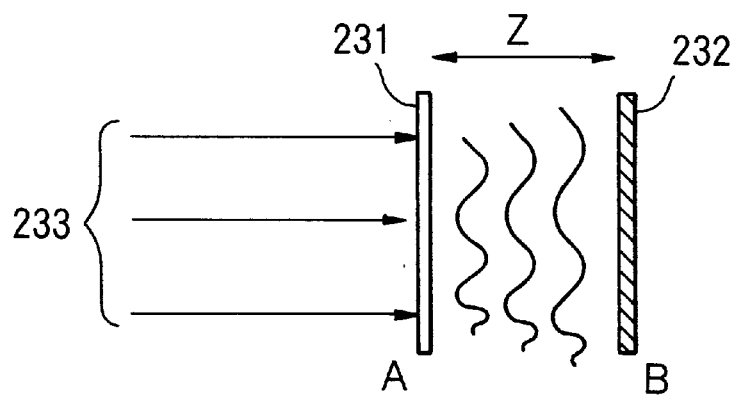
FIGS. 7A and 7B show the system of the calculations of the Fresnel projected images of the method of the present invention.

As shown in FIG. 7A, a reference light 233 is illuminated to the displayed image (original image A (231)), and the holographic fringe pattern (image B) produced in a screen 232, at a position separated by a distance Z, by the wave front of the light passing through the original image A is employed as the image after image conversion.

Figure 7B:
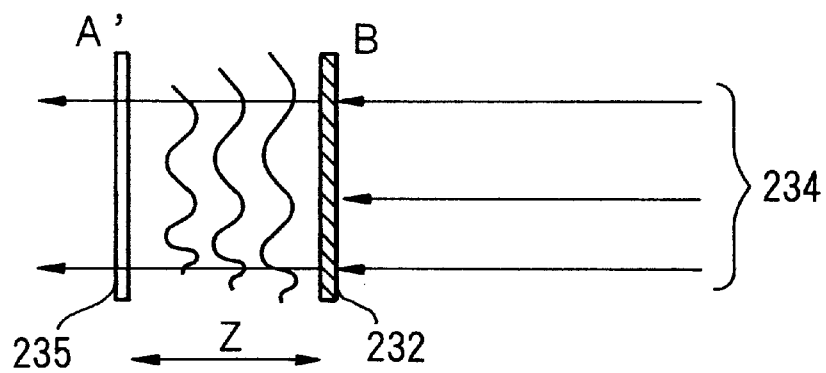

As shown in FIG. 7B, by applying light (234) identical to the reference light to the image B of this screen 232, an image (projected image A') is projected at the position marked by reference 235. This projected image A' constitutes a reproduction identical to the original image A. Hereinbelow, the present embodiment will be explained using this image A—B—A' conversion system.

First, an original image A (consisting of, for example, N×N pixels) such as that shown by reference 231 in FIG. 7A is inputted (step 201). Next, it is assumed that a point light source is present in each pixel of the inputted original image A. At the amplitude $U_0$ of each point light source, for example, using the gray level of each pixel, the wave front on the screen 232 disposed at a position at distance Z is determined. Here, the point light source is expressed in the following terms:

$$u=(U_0/r)\cdot\exp[j(kr+\phi)] \quad (1)$$

Here, the amplitude is represented by $U_0$, and the phase by $kr+\phi$, where $\phi$ represents the initial phase, and j represents $(-1)^{1/2}$; and the image B projected onto screen 232 comprises M×M pixels. Here, k represents $2\pi/\lambda$, where $\lambda$ indicates the wavelength of the reference light, and r expresses the distance between each point light source and each pixel on the screen 232.

Next, the pixel pitch $P_A$ of the inputted image, the pixel pitch $P_B$ of the projected image, the wavelength $\lambda$ of the reference light, the initial phase $\phi_0$, and the distance Z at which the projected image is disposed are determined as calculation parameters (step 202). Next, at each point light source, using the wavelength $\lambda$ and phase $\phi_0$ determined in advance, and by adding the wave front of the light from each point light source at each pixel in image B, a wave front value is calculated at each pixel of image B (step 203). By means of this, the projected image (image B) on screen 232 is obtained.

Figure 9A:
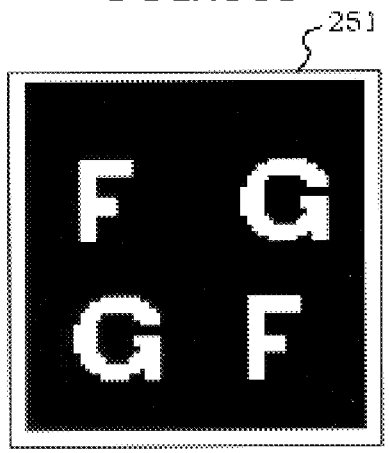
FIGS. 9A–F show concrete examples of images resulting when the Fresnel type hoilograms are employed.

Concretely, the holographic fringe pattern produced on screen 232 by the light from the point light sources (equation (1)) positioned at each pixel on an inputted image (original image A) such as that shown by reference 251 in FIG. 9A may be calculated by means of the following formula:

$$uB=\Sigma\Sigma uA \quad (2)$$

Here, "uA" represents the amplitude value, at the image (at the position shown by uB) on screen 232, possessed by the light from the point light sources positioned at each pixel in the inputted image (original image A), while uB represents the complex amplitude (the sum of all point light sources uA) of the light at a certain position (pixel) on screen 232.

Figure 9B:
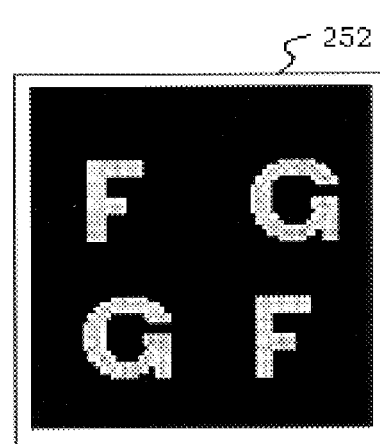
Figure 9C:
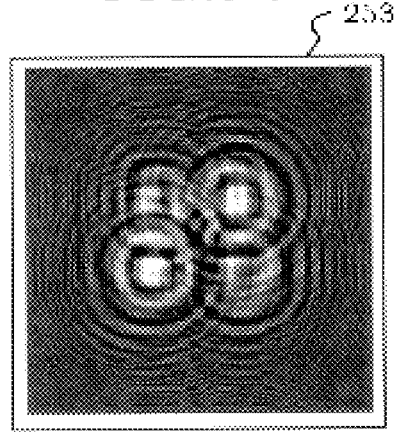
Figure 9D:
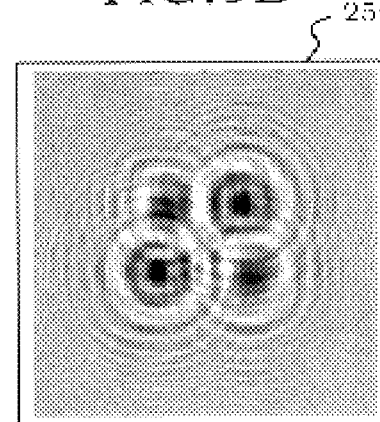

Next, the complex number uB of each pixel is decomposed into a real number part and an imaginary number part, and projected images such as those shown by references 253 and 254 in FIGS. 9C and 9D are obtained.

$$uB=B_{Re}+jB_{Im} \quad (3)$$

Then, the two projected images $B_{Re}$ (real number part) and $B_{Im}$ (imaginary number part) are produced, and these two projected images and the calculation parameters thereof are stored (step 204).

Next, the projected images and the parameters used in the calculations are transmitted and received (steps 206 and 207).

That is to say, the projected image $B_{Re}$ of the real number part, the projected image $B_{Im}$ of the imaginary number part, and, as the parameters used for calculating the images, the position Z of the projected image, the wavelength $\lambda$ of the reference light, the initial phase $\phi_0$ of the reference light, the pixel pitch $P_B$ of the projected image, and the pixel pitch $P_A$ of the original image, are simultaneously transmitted and received.

At the receiving side, while accumulating the received data (step 208), the projected image $B_{Re}$ at distance Z is calculated (step 209) using the parameters used in the calculation (Z, λ, $\phi_0$, $P_A$, $P_B$), with respect to the projected image of the real number part. Next, with respect to the projected image of the imaginary number part, the projected image $B_{Im}$ at distance Z is determined (step 210) using the parameters (Z, λ, $\phi_0+\pi/2$). Then, by adding the two projected images $B_{Re}$ and $B_{Im}$ pixel by pixel, a new projected image (added image) A' (the reproduced image 252 in FIG. 9B) is produced, and this is displayed (step 211); that is to say, the original image A is displayed.

At this time, when a reproducing light is simply applied to the two projected images of the real number part and the imaginary number part, a fusion image is produced by means of the virtual image (original image) and conjugate, and it is unclear which is the original image. By applying light which is phase shifted by π/2 from the reproducing light to the imaginary number part of the pattern, it is possible to cancel only the conjugate image and to reproduce the original image with fidelity.

Next, as a second example of the calculation of the projected image, an example will be explained which employs a Fourier transform type projection method, which is a special type of Fresnel projection. What is meant by a Fourier transform is the transformation method when the value of the distance Z of the previous Fresnel projection is infinite. Disposition at an infinite distance is impossible; however, this system is easily capable of realizing the use of a lens having a focal length f, in a physical manner. Furthermore, with respect to the calculations, the projected images may be rapidly calculated by using fast Fourier transforms (FFT).

Figure 8A:
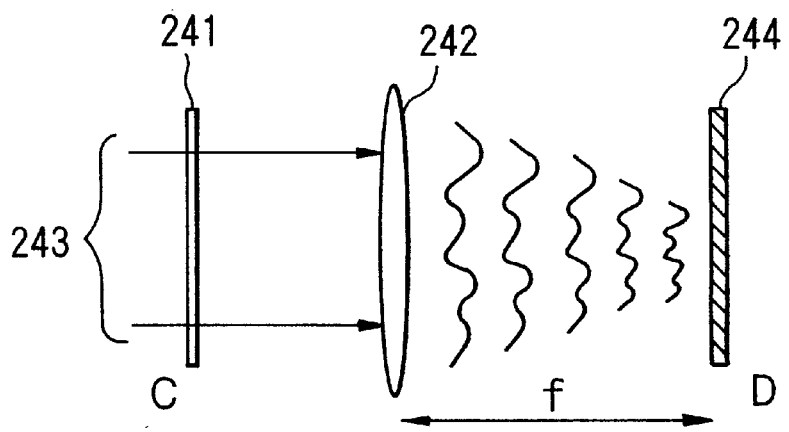
FIGS. 8A and 8B show the system of the calculation of the Fourier transform projected images of the method of the present invention.
Figure 8B:
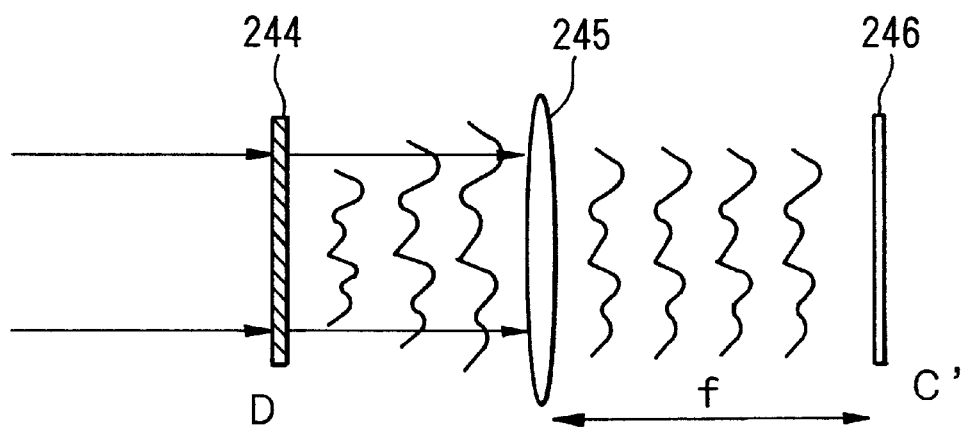

The Fourier transform type projected image corresponds to the calculation of an image D which is projected, which is shown in FIG. 8A, on a screen 244 positioned at a distance f from a lens 242, by light passing through when a lens 242 having a focal length f is positioned in front of an inputted image (original image C (241)), and light having a flat wave front 243 is illuminated to image C as the reference light. As shown in FIG. 8B, by again applying light having a flat wave front and identical to the reference light to the projected image D on the screen 244, positioning a lens 245 having a focal length f in front of this, and obtaining the projected image formed by the wave front passing through lens 245 at the position of the focal length f, it is possible to obtain a reprojected image C' (246) identical to the original image.

The effect of applying the Fourier transform is that output is in terms of a complex number. By again executing an identical Fourier transform with respect to the projected image which is in terms of a complex number, the original image can be reproduced.

Next, an example of the concrete processing will be given.

Figure 10A:
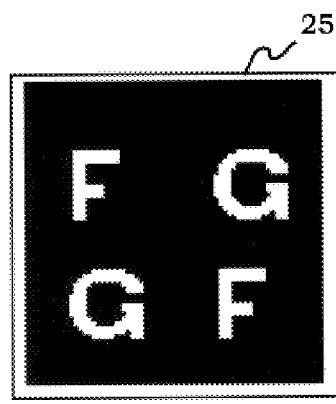
FIGS. 10A–G show concrete examples of images resulting when Fourier-transform type holograms are employed.

After inputting an inputted image C(x, y) such as that shown in reference 251 of FIG. 10A (step 201), the calculation parameters (the wavelength λ of the reference light, the initial phase $\phi_0$, the pixel pitch of the inputted image, the pixel pitch of the projected image, and the focal length f) are determined (step 202). Next, the inputted image C(x, y) is subjected to a Fast Fourier transform. Each pixel FC (fx, fy) of the Fourier-transformed image is subjected to parameter conversion, and by replacing the value of each pixel with a value given by the following formula:

$$f_x = x/(\lambda \cdot z), \; f_y = y/(\lambda \cdot z) \qquad (4)$$

the projected image D is determined by means of calculations (step 203).

That is to say, it is possible to determine the values of each pixel of the projected image D from each pixel FC($f_x$, $f_y$) of the Fourier transformed image by means of:

$$x = f_x \cdot \lambda \cdot z, \; y = f_y \cdot \lambda \cdot z.$$

Figure 10B:
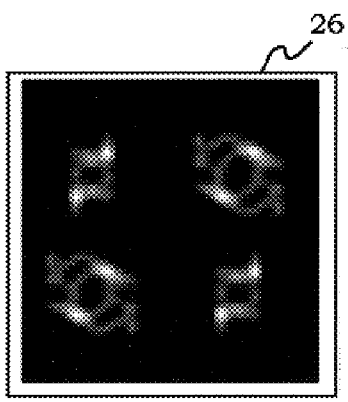
Figure 10C:
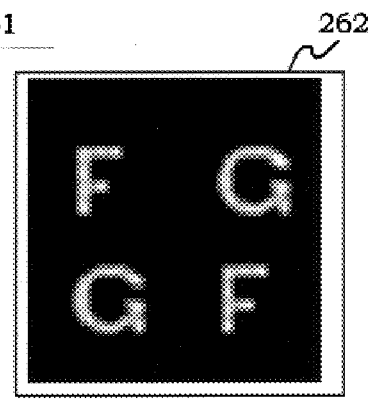
Figure 10D:
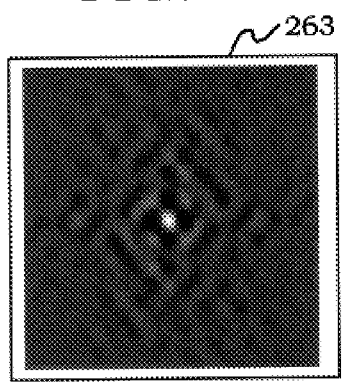
Figure 10E:
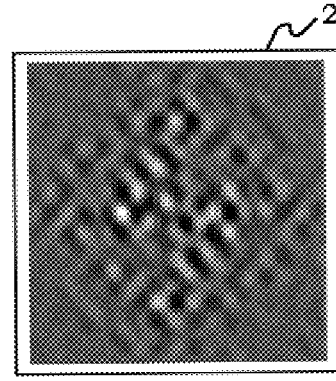

Projected image D is expressed in terms of complex numbers, and this projected image D is resolved into a real number part $D_{Re}$ and an imaginary part $D_{Im}$ (step 204), and two images such as those indicated by references 263 and 264 in FIGS. 10D and 10E are generated, and these are stored together with the calculation parameters (step 205).

Next, images $D_{Re}$ and $D_{Im}$, together with, as the calculation parameters, the wavelength λ used for the reference light, the phase φ, the pixel pitch of the original image, the pixel pitch of the projected image, and the focal length f, are transmitted and received (steps 206 and 207).

Next, at the receiving side, while accumulating the received data (step 208), with respect to the real number part image $D_{Re}$, a projected image is obtained by means of a Fourier transform utilizing parameters identical to those of the reference light (step 209), while with respect to the imaginary number part image $D_{Im}$, the projected image, when phase shifting is conducted by π/2 with respect to the reference light, is calculated using a Fourier transform (step 210). Next, when an image is produced by combining the two projected images, the original image is reproduced (step 211). Reference 262 in FIG. 2C indicates an example of an optically reproduced image in accordance with the present invention.

If only the real number part were employed, as shown by reference 261 in FIG. 10B, the image reproduced would be in a state in which an inverse of the original image was overlaid on the original image. It can be seen that when complex original images are involved, the original image would be unrecognizable as a result of this type of overlaying of images.

Figure 9E:
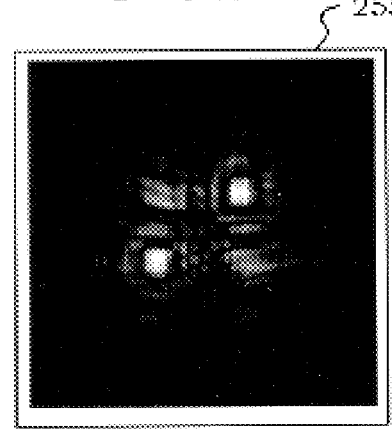
Figure 9F:
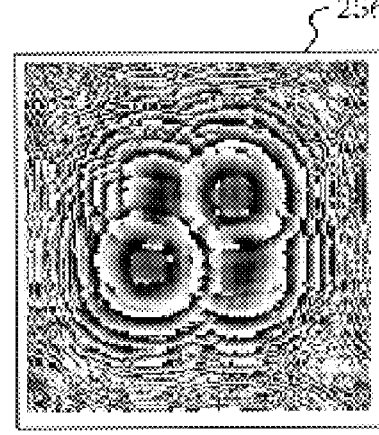
Figure 10F:
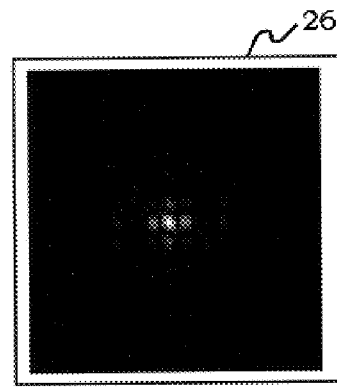
Figure 10G:
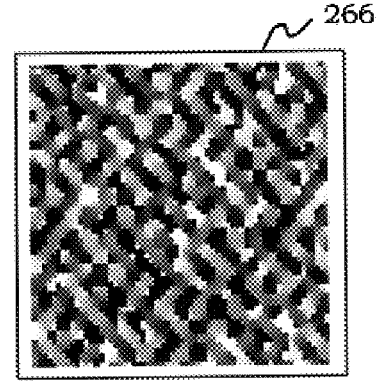

In the embodiment described above, the real number part and the imaginary number part were separately transmitted; however, it is also possible to conduct resolution into an amplitude component and an imaginary number component at the complex amplitude stage, and to separately store and transmit these. For example, in the case of a Fresnel projection, the projected images of the amplitude and phase components have a form such as that shown by references 255 and 256 in FIGS. 9E and 9F, and in the case of the Fourier-transform type, the projected images of the amplitude and phase components are reproduced as images such as those shown by references 265 and 266 in FIGS. 10F and 10G. Furthermore, at the receiving side, the complex component image is again reproduced from the amplitude component and the phase component, the projected image is calculated from the complex component imaged and the real number part is displayed. Alternatively, decomposition may be conducted into a real number part and an imaginary number part, and after applying variable transformation processing such as that described above, a synthesized image may be produced from the projected images of the real number part and the imaginary number part.

Here, the generation of the reproduced image may be conducted by means of calculations on a computer; however, display is also possible by means of a display apparatus which is capable of amplitude and phase control of the light. Furthermore, in the case in which only a display apparatus which is capable of displaying the amplitude is employed, by employing a method in which the images, decomposed into the real number and imaginary number components described above, are separately reproduced, it is possible to optically reproduce the images at high speed.

Furthermore, the dynamic range of the projected image may be varied by means of specific function conversion or the like, and it is also possible to transmit and receive the function parameters simultaneously. That is to say, by manipulating the dynamic range, it is possible to make the image impossible to recognize, being obscured by noise, even if the projected image can be generated from the image transmitted. That is to say, it is possible to use only the image data of a specified range for the projected image. For example, as shown by reference 271 in FIG. 11A, commonly, the projected image obtained is converted in a linear manner and replaced with the gray value of the image; however, as shown by reference 272 in FIG. 11B, the relationship between the calculated value of the projected image and the image gray value may be non-linear.

Furthermore, in the present embodiment, the size of the projected image was given as M×M pixels in the projected image with respect to N×N pixels in the inputted image; however, the values of M and N may be freely selected, and it is possible to set these values so that M=N, or so that M=2*N. Furthermore, the aspect ratio may also be freely selected, and no particular restriction is made with respect thereto in the embodiment described above.

Furthermore, an example was described in which one set of parameters for generating the projected image was employed per image; however, it is possible to change these parameters by pixel, so that for example, the parameters may be changed pixel by pixel in accordance with a predetermined function transformation, and the function parameters may also be transmitted.

Furthermore, in the embodiment described above, an example was described in which the size of the images A, B, C, and D was fixed; however, this size may also be transmitted as a parameter, and the size of the displayed image may be freely set.

Furthermore, in the Fresnel projection type, during image transmission, an example was described in which the projected image was calculated once all the received image data had been received, however, it is also possible to calculate the projected image as the data are received.

That is to say, the calculation parameters may be initially transmitted and received, and using these parameters, the projected image may be calculated from the pixels which have been received, and by doing this, projected images which are unclear at a small number of pixels gradually become clear, so that progressive display is possible.

Furthermore, a method is also possible in which the calculation of the projected is conducted by receiving the data not by pixel, but by blocks, where the image has been divided into specified blocks; no particular restriction is made in the present embodiment with respect to the order of processing of the received data.

Furthermore, a method is also possible in which the image data are transmitted in order from the upper left of the image, or a method is possible in which scanning of the image is conducted from the center thereof outwardly in a spiral pattern; no limitation is made with respect to the order of the transmitted data.

Furthermore, in the Fresnel projection type example, an example was given in which the projected image of one image was transmitted; however, a plurality of images or moving sequences may be disposed at differing Z values, or alternatively, calculation may be conducted by means of values in which the angel of incidence θ of the reference light differs for each frame, and the resulting projected image projected on the same screen may be transmitted. In such a case, the parameters are applied image by image (Z, λ, φ, θ, and the like), and by calculating the projected image at various Z values or various θ values, it is possible to reconstruct the original image. That is to say, it is possible to simultaneously transmit a plurality of image data.

Next, the operation of this embodiment of the image processing apparatus of the present invention provided with the characteristic parts described above will be explained.

When an image to be displayed, or an image to be transmitted, is inputted, this is transmitted to image conversion section 211. In image conversion section 211, the projected image of the inputted image is calculated using the calculation parameters determined by the selected calculation parameter determining section 212, and the projected image calculated, and the calculation parameters thereof, are accumulated and stored in image accumulation and management section 210. In image accumulation and management section 210, the desired projected image, and the calculation parameters thereof, are transmitted by means of the triggering of image transmitting and receiving section 213. On the receiving side, the received data pass through the image transmitting and receiving section 213, and are accumulated in image accumulation and management section 210, and in accordance with the triggering of image display section 214, by means of image conversion section 211, the projected image and calculation parameters thereof which were received and stored as described above are used to calculate the original projected image, and the post-calculation projected image is displayed in image display section 214.

If the control described above is employed, by converting the image to be displayed into a projected image, it becomes impossible to ascertain what was displayed in the original image, and furthermore, insofar as the calculation parameters are not known, it is impossible to obtain the original image, so that it is possible to conduct the encrypted transmission and storage of image data.

Furthermore, in the present embodiment, projected images were obtained by means of calculations during the reproduction of transformed images which were the same as the calculations in the case of the generation of the images; however, reproduction may also be conducted in real time in an optical manner.

For example, a reproduction system which employs only the real number parts will be explained using FIG. 12 as one example thereof; this system displays, in display 281, projected images which are received. The project image which is displayed in display 281 may be made smaller by means of lens 282, and is projected onto display 283. Here, lens 282 is a lens having a variable rate of reduction in accordance with the calculation parameters (the projected image pitch or the distance Z) (for example, the lens may be disposed so as to be movable in a forward and back direction, or a Fresnel lens which conducts electric display, or the like, may be employed).

Display 283 is a high resolution display apparatus which is capable of fine display; a reflecting type liquid crystal or the like is possible. Light corresponding to the calculation parameters (wavelength λ) is applied from 285 to the display 283, and this reproducing light 285 passes through half mirror 284 and is illuminated to display 283. The light reflected by display 283 passes through half mirror 284 and is projected onto screen 287. The image projected onto screen 287 is enlarged by enlarging lens 288, and this is projected onto screen 289 at the size of the original image. Here, the enlargement ratio of the enlarging lens which is employed is variable in accordance with the calculation parameters (the pixel pitch or the distance Z), so that flexible response is possible.

By means of using systems such as that described above, the reproduction of an image is conducted by means of calculations, and during transmission, a projected image is transmitted, and thereby security is ensured, and with respect to reproduction, optical reproduction of the original image is possible in an instantaneous manner.

In the present embodiment, a combination is possible with the method described in the first embodiment.

That is to say, in the encryption and encoding process, in step 204 of FIG. 6A, decomposition may be conducted into an amplitude/phase component rather than into real number part/imaginary number part components, and these may be encoded as described in the first embodiment above. Furthermore, in step 205, the encoded amplitude component and phase component may be stored in place of the projected image of the real number part and the projected image of the imaginary number part.

Additionally, in the encoding and display processes, processing is added, between steps 208 and 209 in FIG. 6B, which decodes the encoded amplitude components and phase components from among the received data, and obtains the real number parts and the imaginary number parts from the decoded amplitude components and phase components.

By means of the above, in addition to the data compression effects described in the first embodiment above, at the receiving side, it is possible to accumulate and manage the data in an encoded manner, and furthermore, it is possible to conduct optical reproduction using an image display apparatus which is capable of displaying standard gray values.

The present invention is provided with: a storage apparatus such as a hard disk or the like which is capable of accumulating and storing data such as projected images and the calculation parameters thereof and the like, and is capable of freely conducting the readout of such data; buffers, or apparatuses corresponding thereto, which are necessary for the storage and the like of data during calculations for the purpose of generating or reproducing projected images, and during other image processing or the like; an output apparatus such as a display or the like for displaying reproduced projected images; and an input apparatus such as a keyboard, a mouse, or the like; by means of computers, or apparatuses corresponding thereto, which control these hard disks, buffers, output apparatuses, and input apparatuses and the like in accordance with procedures established in advance, it is possible to appropriately execute the various functions in the embodiment having the structure shown in FIG. 5, or to appropriately execute procedures and algorithms of the processing in an embodiment of the method of the present invention shown in the flow charts of FIGS. 6A and 6B, and the programs which serve to execute these procedures and algorithms in a computer or the like may be stored in a recording medium capable of being read by this computer, such as a floppy disk, a memory card, a MO, a CD-ROM, or the like.

Furthermore, in order to conduct transmission or reproduction and display by means of a computer, the projected images or the calculation parameters or both which are to be stored or transmitted by means of the method of the present invention may be stored in a recording medium which is readable by the computer, such as a floppy disc, a memory card, an MO, a CD-ROM, or the like.

As described above, in the method described in the present embodiment, during accumulation/transmission, reference light having a wavelength (λ) is applied to an image at an angle of incidence θ, and the projected image which is projected on a screen separated by a distance Z from the image is calculated in terms of a complex amplitude, and this complex amplitude projected image is resolved into a real number part and an imaginary number part, and the two resolved projected images are stored or transmitted together with the calculation parameters (distance (Z), wavelength (λ), or the like), and during reproduction/display, the projected image at distance (Z) resulting when light having a wavelength (λ) is applied to the real number part projected image at an angle of incidence θ is calculated, and the projected image at a distance (Z) resulting when light which is further phase shifted by π/2 from the light having the wavelength (λ) is applied to the imaginary number part projected image is calculated, and an image representing a combination of these two projected images is generated.

Furthermore, as another method, during the calculation of the projected image as a complex amplitude, a lens may be disposed over the entire surface of the image, and the image resulting from light passing through this lens may he employed as the projected image.

Furthermore, in the above method, the two types of images resulting when each pixel of the projected image is decomposed into a real number part and imaginary number part, and the calculation parameters, may be separately stored or transmitted.

Furthermore, in the present method, during the storage or transmission of the projected images obtained by calculation or the calculation parameters (distance (Z), wavelength (λ), and the like), data resulting from the encryption of the projected image data or the calculation parameters may be stored, and the encryption key may be stored simultaneously.

Furthermore, in the above method, during the reproduction of the original image from the stored and transmitted projected images and display thereof, the projected image may reproduced while continuing to read out the stored or transmitted data.

Furthermore, in the present method, during the reproduction and display of the projected images, the projected images may be optically reproduced and displayed via a lens which is capable of enlarging or reducing the projected image.

Furthermore, in the apparatus of the present embodiment, at the storage or transmission side of the projected images, the following are provided: an image conversion section which generates projected images of the inputted images using specified calculation parameters, a section for determining the calculation parameters, and one or both of a section for storing the projected images and the calculation parameters and a section for transmitting the projected images and the calculation parameters, and at the side at which the projected images are reproduced and displayed, the following are provided: a section for receiving the stored or transmitted projected images and calculation parameters, a section for reproducing projected images by means of the received projected images and calculation parameters, and a section for displaying the reproduced projected images.

Furthermore, as a recording medium in the method of the present embodiment, the method described above may be made into a program which may be executed by a computer, and this may be stored in a recording medium which may be read by this computer.

Furthermore, as a recording medium for images in the present embodiment, one or both of the projected images obtained in accordance with the present method and the calculation parameters may be stored in a recording medium which is readable by a computer.

What is meant by the recording of the holographic fringe patterns of the reference light and the light passing through the image is, in other words, equivalent to the recording of a hologram. This hologram is such that, insofar as a reference light (reproducing light) is not applied and the generated image is not observed, it is impossible to recognize what is recorded in the hologram. In other words, it is possible to store the image in an encrypted fashion.

Furthermore, insofar as light identical to the reference light is not applied to the hologram, it is impossible to observe the reproduced image, so that so long as the calculation parameters used to calculate the projected image are not known, it is impossible to reproduce the original image, and thus by handling the calculation parameters and the projected images by means of the third method, it is possible to store the image data securely and safely.

Furthermore, as a way of obtaining the projecting image, the second method, which employs the projected image of the light passing through the image at the infinite point, may be physically realized by viewing this passing light via a lens. This system corresponds to conducting an optical Fourier transform, so that the projected image may be calculated at high speed by applying a Fourier transform. At this time, the result of the Fourier transform output is a complex number, and the projected image of the real number part thereof may be employed as the projected image. Additionally, it is possible to reproduce the original image by again conducting an optical Fourier transform of the projected image. Such projection and reprojection of images using Fourier transforms in this manner is often employed in computer generated hologram simulations and the like.

Commonly, in computer generated holograms, only the real number part described above is employed as the projected image. However, when an image is reproduced using only the real number part, a virtual (true) image and a conjugate image are simultaneously generated, so that an image is reproduced in which the original image and an inverted original image are overlaid, and this causes a problem in that recognition of the original image is impossible (the fusion problem). In other words, by only using the real number part, this can be said to be a type of encryption whereby concealment of the image can be maintained. When the complex amplitude itself is employed in the transmission, as a redisplay method which does not cause the fusion image problem, in order to reproduce the original image, there is a possibility that if the reproduction light wavelength is known, the image data can be easily reproduced. However, by separately transmitting the two holographic fringe patterns (that is to say, the holographic fringe pattern of the real number part and the holographic fringe pattern of the imaginary number part) as in the present invention, if reproduction is conducted by means of only one holographic fringe pattern, recognition of what is recorded is difficult because of the fusion image problem; whereas by combining the two holographic fringe patterns, it is possible to avoid the fusion image problem, and moreover, the security level is twice as high as in the case of a simple transmission of the complex amplitude.

Furthermore, during the storage of the image data of the projected image and the calculation parameters, by encoding and storing the data, it is possible to ensure security during transmission and reception of the image data via a network.

Furthermore, it is a characteristic feature of holograms that the entirety of the reproduced image may be observed even if the data are only partially present. Additionally, if the hologram is small the quality of the reproduced image is poor; however, by employing larger holograms (the size of a large screen), the reproduced images become clearer (reference literature: "Optical Holography," Colloer, Burckhardt and Lin, pp. 526–541 (1971)). That is to say, the projected images used in the present invention also permit the reproduction of the original image even where only partial projected image data exist. By means of the fifth method, the calculation of the reproduced image is carried out, not after all the projected image data have been read into memory, but rather in order while the data are being read in, and thereby the reproduced image becomes gradually clearer, and progressive image reproduction becomes possible.

Furthermore, with respect to the wavelength of the reproducing light employed, it is not necessary to employ the wavelength of actually existing laser light; a calculated simulation is sufficient, so that the types of wavelengths employed are infinite, and it is not a simple matter to decipher the wavelength of the reproducing light.

Additionally, when a wavelength such as that of an existing laser having a wavelength in the visible spectrum is used in the generation of the projected image, the processing of the reprojection may be conducted optically in real time. That is to say, the data sent via a network or the like may be reproduced in real time, and the original image may be displayed.

As described above, in accordance with the present invention, it is possible to realize transmission, reception, and storage of image data while conducting encryption having a high level of security, and moreover, it is possible to conduct progressive reproduction.

(Third Embodiment)

When the holographic fringe patterns of the computer holograms described in the first and second embodiments above are viewed as digital images, the characteristic feature thereof is that the main data of the reproduced image is contained in the more significant bits. For this reason, even if the less significant bits are removed from each pixel, the effect with regard to a decline in the quality of the reproduced image is minimal. Accordingly, it is possible to use the place of these least significant bits for the storage of other image data.

In the present embodiment, an image processing method and apparatus will be explained which employ the characteristic feature described above, and in which a plurality of digital images relating to holographic fringe patterns are multiplexed and a multiplexed image is generated.

Hereinbelow, this embodiment of the present invention will be explained in detail using the figures.

Figure 14:
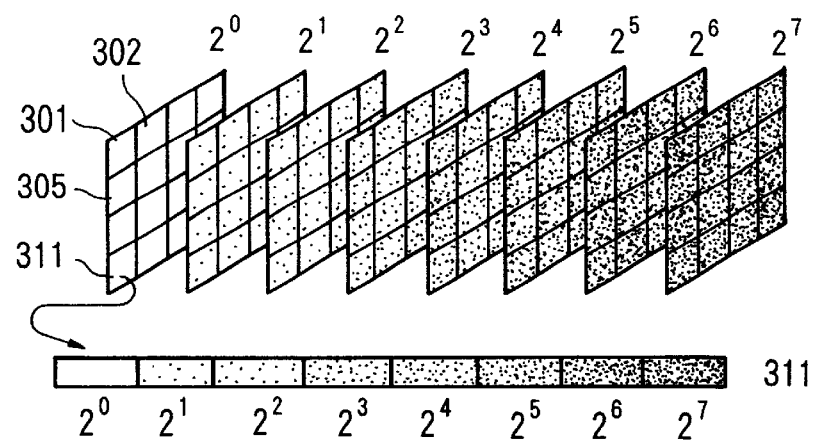
FIG. 14 shows the relationship between the image and bit positions.

First, the definition of the digital images relating to holographic fringe patterns in the present embodiment will be explained using FIG. 14. Hereinbelow, digital images in which the holographic fringe patterns of computer generated holograms have been rendered in a digital format will be simply referred to as "digital images".

In the present embodiment, in the digital image, each pixel comprises 8 bits. The bit positions of each pixel comprising the digital image are termed, as shown in FIG. 14, from the least significant bit, the $2^0, 2^1, 2^2, 2^3, 2^4, 2^5, 2^6$, and $2^7$ positions. In FIG. 14, references 301, 302, 305, and 311 and the like are codes which indicate the pixels comprising the digital image, and in FIG. 14, as an example, pixel 311 is extracted, and the bit positions thereof are shown. 8 bits is used here as an example of the number of bits of the digital image; however, this bit number may be freely set.

With respect to the generation of the image related to the holographic fringe patterns and the hologram display (image display) employing these holographic fringe patterns, this is as previously explained in the first and second embodiments, and an explanation thereof will be omitted here.

Next, using FIGS. 13A and 13B, a image processing method which produces a multiplexed image from a plurality of digital images will be explained.

Figure 15:
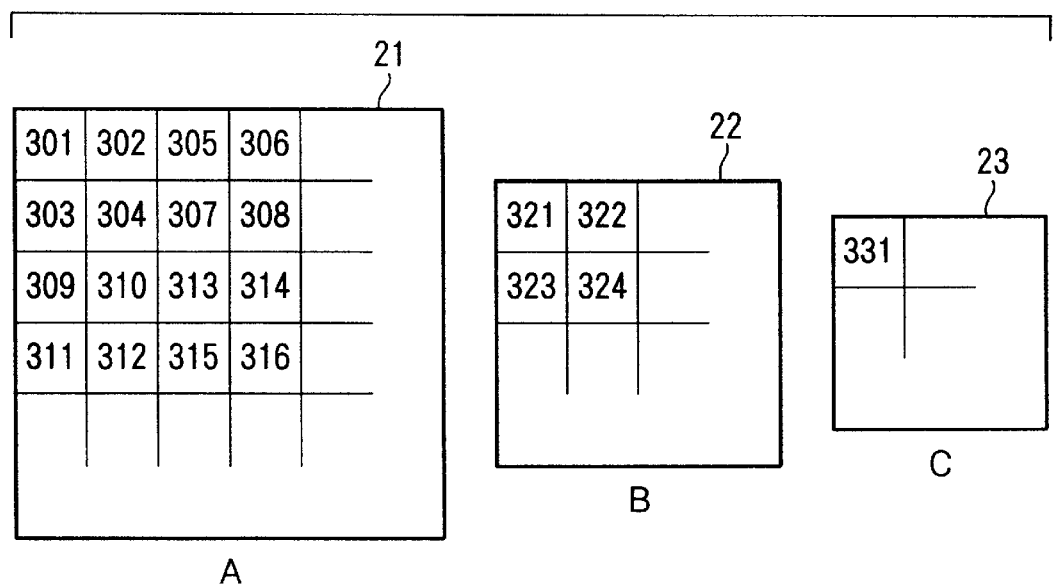
FIG. 15 shows an example of an arrangement of image pixels.

First, a plurality of digital images is inputted; these will be subjected to multiplexing processing (step 401). In the present embodiment, the case in which three digital images having differing sizes, such as those shown in FIG. 15, are inputted, will be explained. For example, with respect to the size of the digital images, the size of the digital image A indicated by reference 21 is 256×256 pixels, the size of the digital image B indicated by reference 22 is 128×128 pixels, and size of the digital image C indicated by reference 23 is 64×64 pixels. In FIG. 15, the references assigned to the three digital images serve to specify the pixels of the respective digital images.

Figure 16:
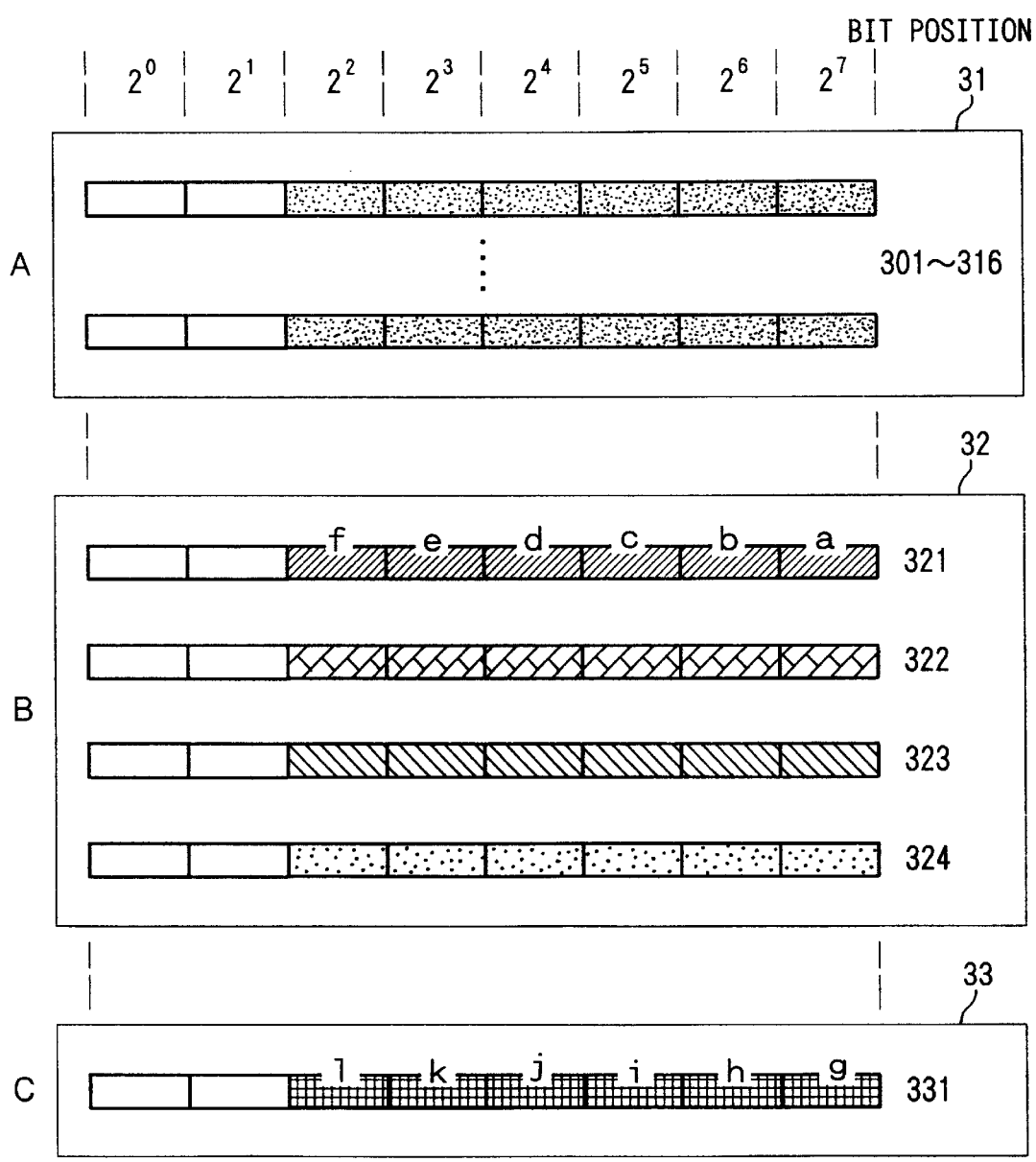
FIG. 16 shows the bit series of each pixel of each image depicted in FIG. 15.

Furthermore, FIG. 16 shows the bit series of the specified pixels of each digital image shown in FIG. 15. In FIG. 16, reference 31 indicates the bit series of pixels 301–316 of digital image A of FIG. 15, reference 32 indicates the bit series of the pixels 321–324 of the digital image B of FIG. 15, and reference 33 indicates the bit series of pixel 331 of digital image C of FIG. 15. Hereinbelow, in reference 32 in FIG. 16, the most significant 6 bits of pixels 321–324 will be referred to as a, b, c, d, e, and f in order from the most significant bit. In the same way, in reference 33, the most significant 6 bits of pixel 331 will be referred to as g, h, i, j, k, and l in order from the most significant bit.

Next, the bit replacement method relating to the multiplexing of the image is determined (step 402). Here, the bit substitution method is stipulated so that the more significant bits of each pixel of each digital image are stored. Here, even if an image is reproduced using only the more significant bits of each pixel of a holographic fringe pattern digital image, the decline in the image quality is minimal; the reason for this will be explained hereinbelow.

The case will be considered in which the object has a single point light source. When the holographic fringe pattern of the wave front from this point light source is recorded as a hologram, the data of a single point are scattered over the entirety of the hologram surface. Since the hologram is a recording method which has considerable data redundancy, when reproduction is conducted, the original image may be reproduced even if a portion of the hologram is missing. This hologram does not merely have flat surface redundancy but also a similar redundancy with respect to the bit positions of the digital image. To take an extreme example, even if an image were to be rendered in binary form, the gray data of the original image would be scattered throughout the hologram and stored. The reason for this is that the data necessary to the hologram are the spacings (phase component) in the holographic fringe pattern recorded as described in the first embodiment; in comparison with the phase data, the gray levels of the pattern have little importance. In actuality, the gray levels may be expressed even in binary holograms which are expressed in binary terms. That is to say, the light passing through the hologram is not rendered in a binary format, but is rather in an analog wave form, so that it is possible to easily alter the gray levels using the spacing of the pattern if the amount of light is adjusted.

When holographic fringe patterns are viewed as digital images, using the characteristic that the main data relating to the reproduced image are contained in the more significant bits, the bit replacement method is stipulated such that the more significant bits of each pixel of each digital image are stored, and multiplexing of the image is conducted.

For example, as a method of bit substitution, the most significant 6 bits of digital image A remain as data relating to digital image A, while data relating to the most significant 6 bits of the other digital images B and C are allocated to the remaining two least significant bits.

Figure 17:
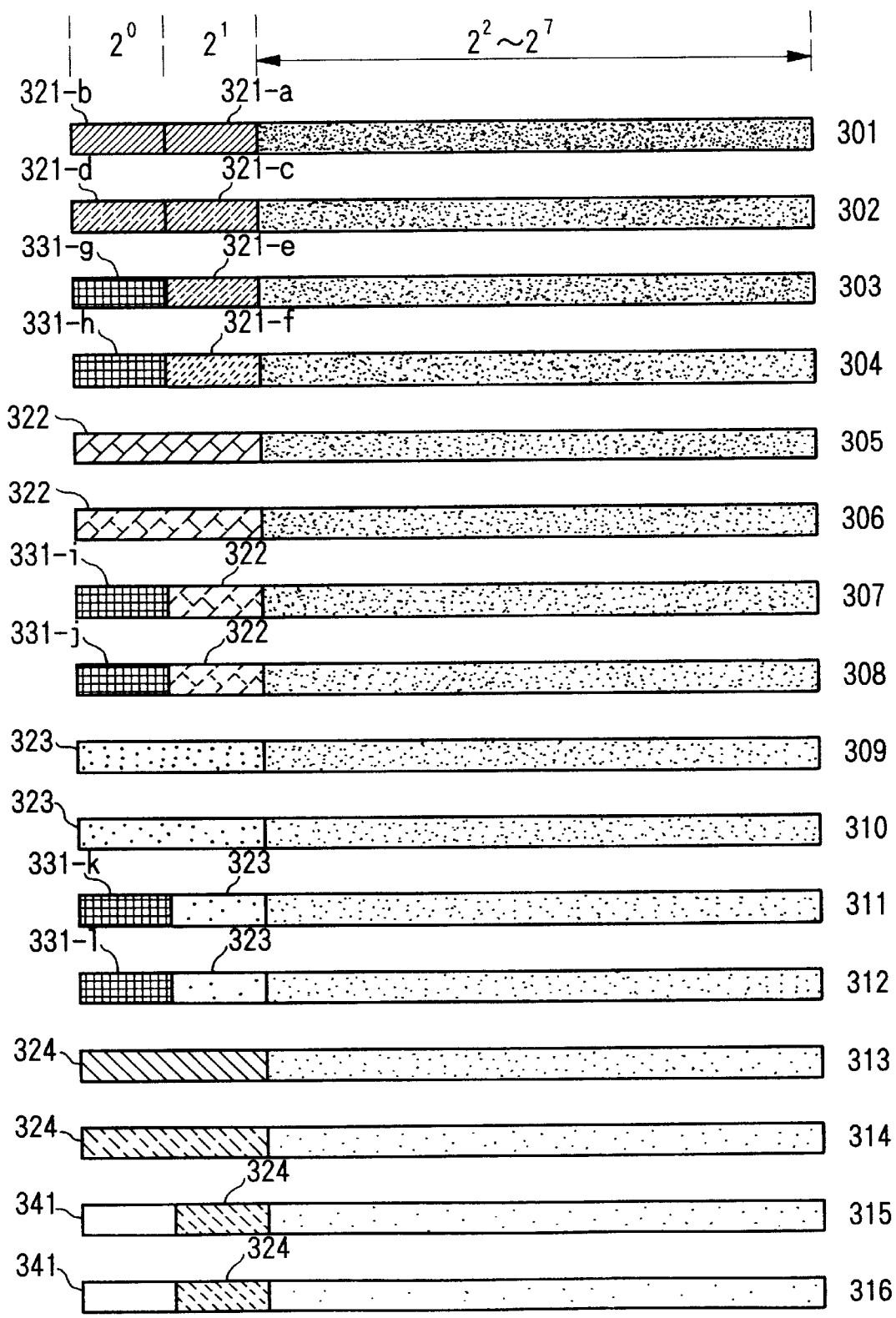
FIG. 17 shows the bit series of each pixel of a multiplexed image which is generated.
Figure 18:
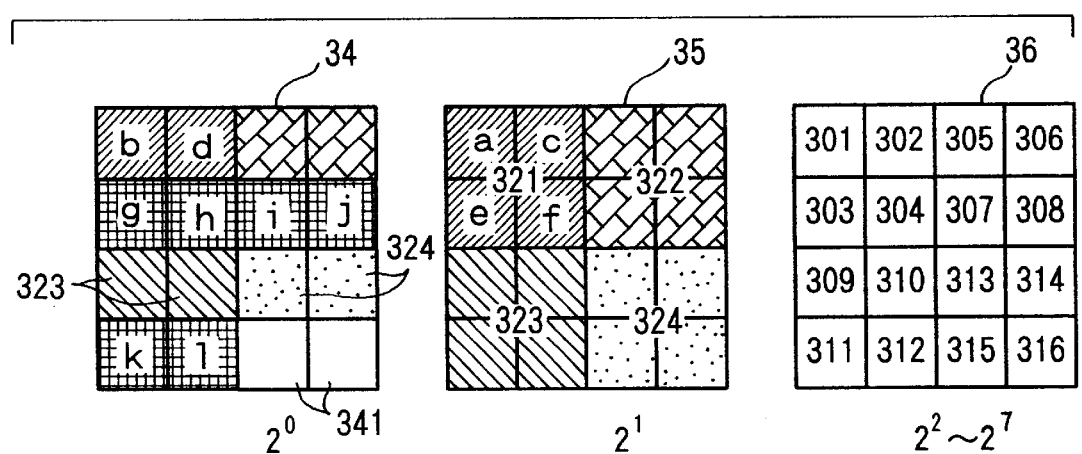
FIG. 18 shows the bit allocation at each bit position of the multiplexed image generated.

An example of this bit substitution method is shown in FIGS. 17 and 18. FIG. 17 shows the bit series of each pixel of a multiplexed image generated based on a digital image A. References 301–316 indicate the pixels of FIG. 15. In an example of a bit substitution method, the most significant 6 bits of pixels 301–316 are set to the most significant 6 bits of digital image A. Additionally, the most significant 6 bits of pixel 321 of digital image B are allocated, as shown in FIG. 17, to the less significant bits of pixels 301, 302, 303, and 304. In the example shown in FIG. 17, a bit substitution method is adopted in which a and b of pixel 321 of digital image B are assigned to the least significant $2^1$ and $2^0$ bits of pixel 301, while c and d of pixel 321 are assigned to the least significant bits of pixel 302, e of pixel 321 is assigned to the less significant $2^1$ bit of pixel 303, and the value f of pixel 321 is assigned to the less significant $2^1$ bit of pixel 304. In the same way, in this bit substitution method, the value of the most significant 6 bits of pixels 322, 323, and 324 of digital image B are assigned to the least significant bits of pixels 305–316, as shown in FIG. 17.

Next, in the bit substitution method, with respect to pixel 331 of digital image C, as shown in FIG. 17, the value of the most significant bits g, h, i, j, k, and l of pixel 331 are allocated in order to the least significant bit $2^0$ of pixels 303, 304, 307, 308, 311, and 312.

FIG. 18 shows pixels 301–316 of FIG. 17 by bit position; reference 34 indicates the least significant bit position $2^0$ of the 16 pixels, while reference 35 indicates the bit position $2^1$, and reference 36 indicates bit positions $2^2$–$2^7$.

As can be seen from FIGS. 17 and 18, in this bit substitution method, no data is allocated to the bits indicated by reference 341.

Next, based on the bit substitution method stipulated in step 402, the more significant bits of each pixel of digital images B and C are extracted, and allocation of the bits of the extracted digital images B and C to the less significant bits of digital image A is generated (steps 403 and 404);

By means of this, these images, which have different sizes, may be recorded in a number of pixels and with an amount of data corresponding to one digital image A. Additionally, the multiplexed image which is generated may be stored, displayed, or transmitted and received (step 405).

In the above manner, a multiplexed image is generated from a plurality of digital images.

Here, the explanation concerned a case in which digital images A, B, and C were different images; however, these may be identical images, and by employing the images as images having different resolutions, it is possible to store image data having a multiplexed degree of resolution using an amount of data corresponding to the data of one image. By means of this, the progressive display of the image, and the display of an image having a degree of resolution appropriate to that of the display apparatus, are possible.

Furthermore, it is also possible to treat the digital image A as relating to a background image, and to treat digital images B and C as images relating to a component images used to produce the background image. In such a case, the offset value of images B and C, respectively, is attached as a header or the like to the multiplexed image, as data relating to the allocation of digital images B and C to digital image A. Here, with respect to the background image, the size of the component images is set so as to be sufficiently small as to permit multiplexing by means of the method described above.

As shown by reference 341 in FIGS. 17 and 18, the portions corresponding to the least significant bits $2^0$ of pixels 315 and 316 are left empty. Considering the entirety of digital image A, in this example, 2 bits are empty in a region of 4×4 pixels, and there is a total excess of 8,192 bits $\{=(256/4)\times(256/4)\times2\}$. It is possible to store additional information relating to the images, such as for example, the offset values of the component images described above, using this area.

The disposition of the images and bits described in this embodiment to this point only represent one example, and it is possible to vary these in accordance with the image data, so that the present embodiment is not limited to the example herein.

Next, an example of the transmission, receiving, and display of such a multiplexed image will be explained with reference to FIG. 13B. Hereinbelow, the side which conducts this processing is termed the "receiving side".

In the image processing method relating to multiplexing described above, a correspondence table is prepared with respect to the image allocation or bit allocation stipulated by the bit substitution method, and this is appended to the multiplexed image and is transmitted and received (step 411).

At the receiving side, the appended table is first read in (step 412), then the data are subjected to bit allocation in correspondence with the table (step 413) and the images are returned to their original size, and generation and display are conducted (step 414).

When the stored multiplexed image is displayed, the steps 412–414 described above are conducted.

Furthermore, the display method in accordance with the display capacity of the display apparatus will be discussed. First, in the method described above, a multiplexed image and a table corresponding thereto were generated by images having a plurality of degrees of resolution, and these were stored in some type of storage medium, or were transmitted and received (steps 401–405 and step 411).

At the display apparatus side, in accordance with the size of the displayed screen which is set in advance, if 128×128 pixels, for example, is used as the effective image display size, reference is made to the correspondence table which was stored (step 412), and only the bit data corresponding to 128×128 pixels is obtained from the multiplexed image (step 413). By means of this, the image data which are to be displayed themselves fit the capacity of the display apparatus, so that it is possible to efficiently manipulate the image. Furthermore, in cases in which the image is to be printed or the like (step 415), a higher resolution image is required, so that reference is again made to the correspondence table (step 412), and the bits corresponding to an image having a size appropriate for printing are read out (step 413), and the image is printed.

One merit of forming the holographic fringe patterns into a multiplex resolution image is that it is possible to alter the precision of the display of the object which is to be displayed. That is to say, when the holographic fringe pattern has a high resolution, it is possible to conduct expression up to the components having a high spatial frequency. This makes it possible to express the detailed shape of an object, such as the texturing or the like, or the minute form of the surface thereof. Furthermore, when the resolution is low, it is only necessary to store the components having a low spatial frequency, so that expression in terms of the overall shape of the object results. In other words, by selecting not merely the degree of resolution of the display apparatus but also, where necessary, the appropriate holographic fringe pattern, it is possible to express the degree of resolution (degree of detail) which is necessary for the object.

Furthermore, an example was given in which background images and component images were prepared as images to multiplexed. With respect to the background images, by combining a plurality of component images having the same degree of resolution, the method described above may be used where multiplexing is to be carried out.

On the other hand, even if the size of the component images with respect to the background image is the same, multiplexing is carried out in the same manner even if the size of the images to be multiplexed is larger. In other words, the background image is made a single image of a predetermined size, and a plurality of images having different degrees of resolution are used as the component images, and with respect to a single background image, a plurality of component images having different degrees of resolution are multiplexed. In the case in which the background image and the component images are to be developed and displayed from the multiplexed image multiplexed there from, first, in the method described above, the background image and the component images are decomposed, and the component images having the same degree of resolution as the background image are combined with the background image. Furthermore, when the degree of resolution of the image resulting from a combination of the background image and the component images is to be increased, the degree of resolution of the extracted background image is increased by means of predetermined image processing, and component images having a degree of resolution corresponding to this increased degree of resolution are extracted from the multiplexed image, and these are then combined with the background image having an increased degree of resolution. Parts of the component images employ the original high-resolution data, so that with respect to the component images, it is possible to obtain clear images.

Next, an image processing apparatus which executes the method described above will be described.

Figure 19:
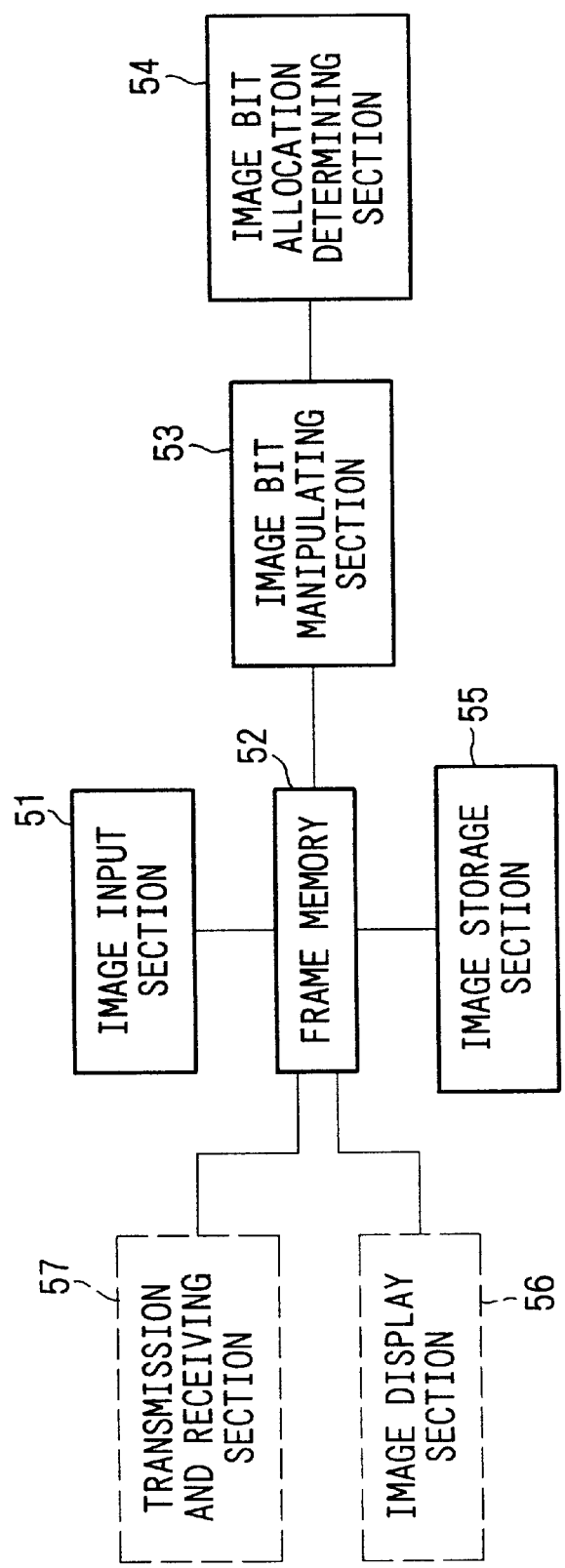
FIG. 19 is a block diagram showing an example of an apparatus in accordance with the third embodiment.

FIG. 19 is a block diagram showing an example of the structure of the apparatus of the present embodiment. From FIG. 19 it can be seen that the image processing apparatus is provided with an image input section 51, a frame memory 52, an image bit manipulating section 53, an image bit allocation determining section 54, and an image storage section 55. Furthermore, when a multiplexed image is to be displayed, an image display section 56 is provided. Furthermore, when the multiplexed image is to be transmitted and received, an image transmission and receiving section 57 is provided.

Here, image input section 51 is provided for the purpose of inputting a plurality of digitalized images serving as the object of multiplexing processing, which are images relating to holographic fringe patterns resulting from reference light and light from an object. Frame memory 52 is an operating memory during the generation of the multiplexed image, while image storage section 55 is provided for the purpose of storing the plurality of images inputted by means of the image input section 51, as well as the multiplexed image which is generated. Additionally, image bit determining section 54 is provided with the function of stipulating the bit substitution method such that the more significant bits of each pixel of the plurality of images are stored, while image bit manipulating section 53 is provided with the function of manipulating the bit series of each pixel of the inputted digital images based on each bit substitution method determined by image bit allocation determining section 54, and generating a multiplexed image in frame memory 52.

The operation of this apparatus will be explained hereinbelow.

First, the digital images inputted into image input section 51 are stored in image storage section 55, and one digital image is read into frame memory 52, and based on the number of bits in the image, the size, and the like, a bit substitution method for determining the allocation of the less significant bits and the disposition method of the other images is determined by means of bit allocation determining section 54. Next, a different image is read into frame memory 52, and based on the previously determined bit substitution method, the newly read-in image is divided into bits in bit manipulating section 53, and allocation is conducted to the less significant bits of the image which was previously read in. With respect to the initially read-in image, after all multiplexing has been conducted, the new image is stored in image storage section 55.

Furthermore, when the stored image is transmitted, this image is transmitted to other display apparatuses, storage media, or the like via an image transmitting and receiving section 57. Additionally, in display apparatus 56, display is conducted while successively reading out only those images of portions corresponding to the specifications of the display apparatus, from among the stored images.

Figures 13A, 13B:
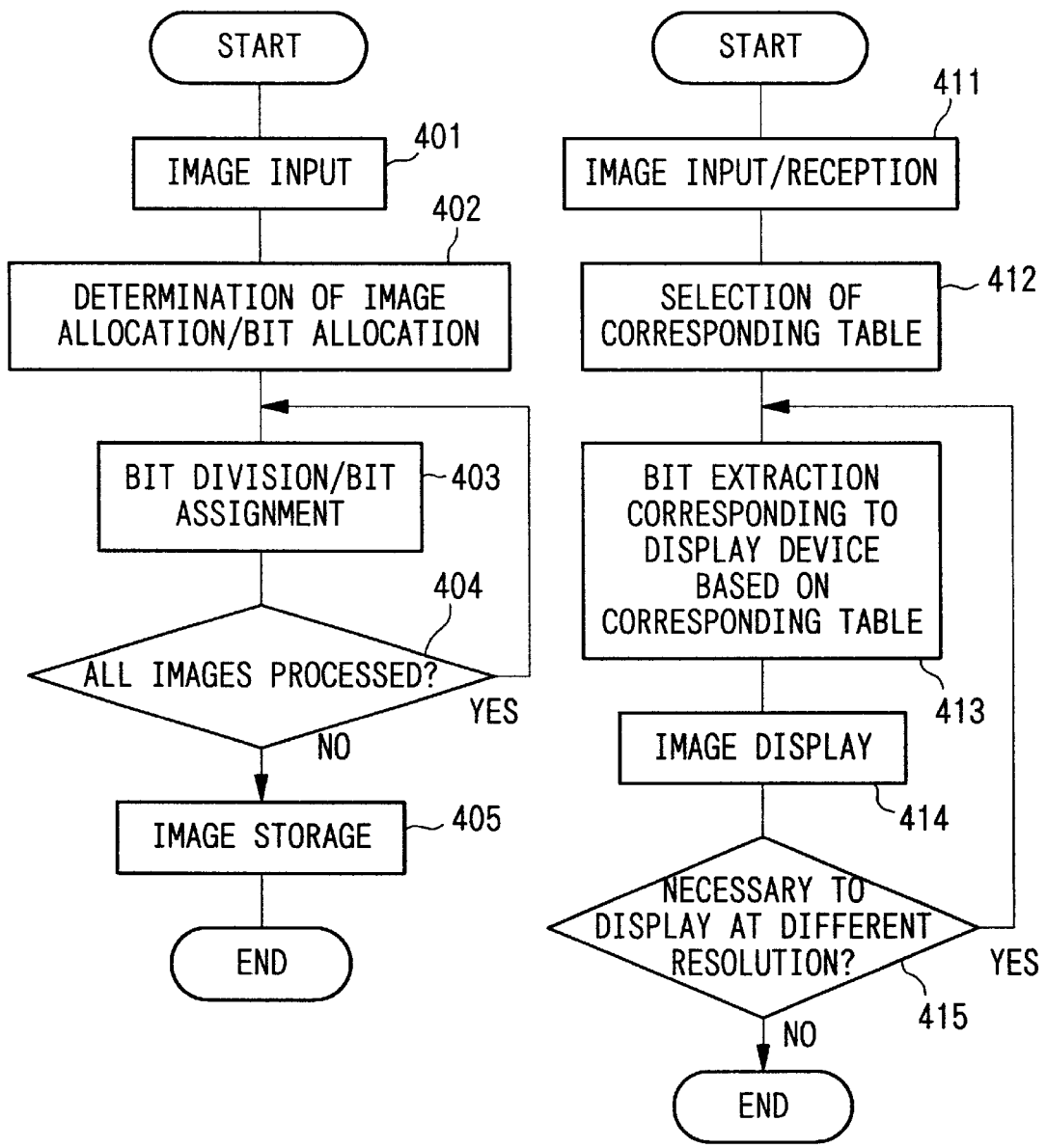
FIGS. 13A and 13B are flow charts showing the order of processing in the method in the third embodiment.

The correspondence between the sections of FIG. 19 and the processing steps of FIG. 13A is as follows: image input section 51 executes step 401, image bit allocation determining section 54 executes step 402, image bit manipulating section 53 executes steps 403 and 404, while image storage section 55 executes step 405. Furthermore, when a multiplexed image is to be displayed by the apparatus shown in FIG. 9, transmission and receiving section 57 executes step 411 of FIG. 13B, image bit manipulating section 53 executes steps 412 and 413, and image display section 56 executes steps 414 and 415.

In the present embodiment, digital images were used as the inputted images; however, analog data is acceptable for the inputted images, and it is possible to adapt the present invention by changing to digital images in image input section 51 in accordance with the attributes of the images or in accordance with the amount of data.

As described above, when digital images in which each pixel comprises n bits are employed, the important image data are chiefly contained in the more significant bits. Accordingly, even if different data are written into the less significant bits, the effect on the quality of the image will be minimal. That is to say, depending on the image, it is possible to determine the less significant bits so as not to affect image quality. Here, a plurality of images are read out to a previously stipulated number of more significant bits (for example, n/2 bits), and these are combined. In other words, a certain image is selected (for example, the image having the greatest amount of data), and the data of the more significant bits of other images are written into the less significant bits thereof. At this time, an indication of the bit position from which data relating to differing images is written is either determined in advance at the system level, or is appended to the images as additional data. By means of this, the amount of data in one image may be used to incorporate data relating to two images.

Furthermore, as a method for multiplexing image data: where the image size is reduced by one half at a time, the more significant bits of one pixel of a half size image are allocated to the less significant bits of four pixels of the initially selected image. By repeating this processing, normal size image data are incorporated in the more significant bits of the pixels, and then one half size image data are incorporated into the more significant half of the remaining less significant bits, and furthermore, ¼ image data are incorporated into the bits of the more significant half of the remaining less significant bits.

When this image is read out, in accordance with the screen size of the display apparatus, it is easily possible to display the images at the optimum size for the screen of the display apparatus by obtaining the data of the bits at the appropriate positions.

Furthermore, it is also possible to employ component images and background images. At this time, it is not necessary that the degree of resolution of the background image and the degree of resolution of the component images be identical; by selecting the degree of resolution of the component images so as to be relatively larger than that of the background images, it is possible to make the component image portions highly detailed.

Furthermore, the multiplexing of the digital images described in the present embodiment may be combined with the encryption processing described in the second embodiment.

In this manner, by means of the present invention, it is possible to store, or to transmit and receive, a plurality of images using an amount of data corresponding to one image, and furthermore, display corresponding to the specifications of the display apparatus is possible, so that excess memory capacity or image processing is not required.

Each section in the apparatuses showed in the first through third embodiments functions as a part of the processing. In other words, each section (each processing part) is realized in terms of dedicated hardware, or the function thereof is realized by executing programs using a memory and CPU (central processing unit) which are provided but not depicted in the drawings.

Furthermore, programs which serve to execute the methods described in the embodiments are stored in a recording medium which is readable by a computer, and the program stored in the in recording medium may be read into the computer system, and executed, and thereby, image transmission and image processing may be conducted. Here, what is meant by a "computer system" is a system which includes an operating system and hardware such as peripheral devices and the like. Furthermore, what is meant by "a recording medium which is readable by a computer" is portable media such as floppy disks, magneto-optical disks, ROMS, CD-ROM, and the like, and hard disks and the like which are mounted in computer systems. Furthermore, "recording media which are readable by computers" include, as in communication lines in the case in which programs are transmitted via communication circuits such as networks such as the Internet or the like or telephone circuits or the like, memories which store programs in a dynamic fashion for short periods of time, and memories which temporarily store programs, such as the volatile memories within computer systems which function as servers or clients. Furthermore, the programs described above may serve to realize a portion of the functions described above, or the programs may realize the finctions described above in combination with programs previously stored in the computer systems.

Next, the fields in which the image transmission/processing methods and apparatuses described in the first through third embodiments are used will be described.

The present invention involves an image transmission/ processing technique which employs computer generated holography; this relates to the transmission and storage of not merely three-dimensional images but conventional two- dimensional images as well. Additionally, this technique may be employed in virtual reality data transmission in the transmission of stereoscopic images via networks. Concrete applications include three-dimensional television, CAD systems, network-type virtual reality computer games, and the like.

What is claimed is:

1. An image transmission method employing phase/ amplitude resolution processing, in which three-dimensional data of an object recorded as a holographic fringe pattern by means of reference light and light from the object are transmitted sequentially, and at the receiving side, the holo- graphic fringe patterns received are displayed sequentially and with reference to reproducing light, and the object is displayed in a three-dimensional manner;

wherein, at the transmission side, the following processes are present:
 a process in which the image of the holographic fringe pattern expressed in terms of complex numbers is resolved into an amplitude component image and a phase component image,
 a process in which the high frequency component of the spatial frequency in the amplitude component image decomposed in this way is reduced, processing for converting the gradation in the phase component image is carried out, and each image is compressed and encoded after this processing, and
 a process in which the image data of the two compo- nents compressed and encoded in this way are sepa- rately transmitted;

and on the receiving side, the following processes are present:
 a process in which the image data of the two components, which were separately transmitted, are received,
 a process in which the received image data are decoded sequentially into an amplitude component image and a phase component image, and
 a process in which the decoded amplitude component image and phase component image are again com- bined into a complex component and displayed.

2. An image transmission method employing phase/ amplitude resolution processing in accordance with claim 1, wherein, in said transmission process, the transmission procedure or transmission period of the image data of the phase component and the amplitude component are altered in accordance with the type of holographic fringe pattern image.

3. An image processing method in which image data are converted, and the converted image data are stored or transmitted, wherein
 a process in which image data are placed at a certain spatial position, specified reference light is applied to said image, and based on a calculation of the projected image generated by light passing through said image or by reflected light, an image having a complex ampli- tude value is determined, and
 a process in which two types of images, resulting from the resolution of each pixel of the projected image having a determined complex amplitude value into a real number part and an imaginary number part, and calcu- lation parameters used to generate the projected image, are stored or transmitted,
are provided.

4. An image processing method in accordance with claim 3, wherein, in the process for determining the projected image by means of calculations,
 a lens is disposed over the entire surface of the spatial position at which the image data are allocated, and the projected image at the focal length of the lens is determined.

5. An image processing method in accordance with claim 3, wherein, in the process of storage and transmission,
 the two types of images resulting from the resolution of each pixel of the projected image into a real number part and an imaginary number part, and the calculation parameters, are separately stored and transmitted.

6. An image processing method in accordance with claim 3, wherein, in the process of storage and transmission,
 the two types of images resulting from the resolution of each pixel of the projected image into a real number part and an imaginary number part, and calculation parameters containing the wavelength of the sample light, and data relating to the position at which the image data are disposed, are encoded and stored or transmitted.

7. An image processing method in which projected images stored or transmitted by the image processing method of claim 3 are reproduced and displayed, wherein
 a process wherein light having the same wavelength as the reference light is illuminated to the image of the real number part, and light having the same wavelength as the reference light, but phase-shifted by $\pi/2$ therefrom, is illuminated to the image of the imaginary number part, and the wave fronts of the transmitted light are respectively calculated, the value of the addition of the two transmitted light wave fronts is generated as an image, and the projected image is thus reproduced, and
 a process in which the reproduced projected image is displayed,
are provided.

8. An image processing method in accordance with claim 7, wherein, in the process of reproducing the projected image,
 the projected image is successively reproduced while reading out the two types of images stored or transmitted, and the calculation parameters.

9. An image processing method in accordance with claim 7, wherein, in the process of displaying the projected image,
 the reproduced projected image is passed through a lens capable of enlargement or reduction of the image in accordance with the calculation parameters, and is optically projected.

10. An image transmission apparatus by means of phase/ amplitude processing, in which data of a three-dimensional object recorded as a holographic fringe pattern by means of reference light and light from the object are transmitted sequentially, and at the receiving side, the holographic fringe patterns received are displayed sequentially and reproducing light is applied to the holographic fringe patterns thereof, and the object is displayed in a three-dimensional manner;
 wherein are provided, on the transmission side:
  a section for inputting complex amplitude holographic fringe pattern images,
  a section for decomposing the holographic fringe pat- tern images into a phase component image and an amplitude component image,
  a section for applying image processing which reduces the high frequency component of the spatial frequency in the amplitude component image which was decomposed in this manner, a section for conducting image processing which executes gradation conversion of the phase component image which was decomposed in this manner, and a section for compressing and encoding the component images subjected to image processing in this manner, are provided, and wherein are provided, on the receiving side:

a section for decoding the compressed and encoded image data into a phase component image and an amplitude component image, and a section for synthesizing the decoded phase component image and amplitude component image into a complex amplitude image.

11. A computer-readable recording medium for recording image processing programs for converting image data and storing or transmitting the converted images, wherein the image processing program causes a computer to execute the following:

a process for placing image data in a certain spatial position, applying specific reference light to the images, and obtaining images having complex amplitude values by calculating projected images generated by light passing through these images or by light reflected therefrom, and a process for storing or transmitting the two types of images resulting from the decomposition of each pixel of the projected images having complex amplitude values which were thus determined into a real number part and an imaginary number part, and calculation parameters for generating the projected images.

12. A recording medium for storing image processing programs in accordance with claim 11, wherein, in the process of determining the projected images by section of calculations, a lens is disposed over the entirety of the spatial position to which the image data are allocated, and the projected image is determined at the focal length of the lens.

13. A recording medium for recording image processing programs in accordance with claim 11, wherein, in the process of storage and transmission, the two types of images resulting from the decomposition of each pixel of the projected images into a real number part and an imaginary number part, and the calculation parameters, are separately stored and transmitted.

14. A recording medium for storing image processing programs in accordance with claim 11, wherein, in the process of storage and transmission, the two types of images resulting from the decomposition of each pixel of the projected images into a real number part and an imaginary number part, and calculation parameters, including the wavelength of the reference light, and data relating to the position at which the image data are positioned, are encrypted, and stored or transmitted.

15. A computer-readable recording medium for recording image processing programs which reproduce and display projected images stored or transmitted by means of the image processing method of claim 3, wherein, the image processing program causes a computer to execute:

a process for calculating the transmitted light wave fronts when light having a wavelength identical to that of the reference light is applied to the real number part image, and light having a wavelength identical to that of the reference light and phase shifted by $\pi/2$ therefrom is applied to the imaginary number part image, and for generating the sum of the two transmitted light wave fronts as an image, thus reproducing a projected image, and a process for displaying the reproduced projected image.

16. A recording medium for recording image processing programs in accordance with claim 15, wherein, in the process of reproducing the projected image, the projected image is successively reproduced while reading out the two types of images and the calculation parameters which were stored or transmitted.

17. A recording medium for recording image processing programs in accordance with claim 15, wherein, in the process of displaying the projected image, the reproduced projected image is optically projected via a lens capable of enlarging or reducing the image in accordance with the calculation parameters.

18. An image processing apparatus for converting image data, and storing or transmitting the converted image data, comprising:

a processing section in which image data are placed at a certain spatial position, specified reference light is applied to said image, and based on a calculation of the projected image generated by light passing through said image or by reflected light, an image having a complex amplitude value is determined; and a process section in which two types of images, resulting from the resolution of each pixel of the projected image having a determined complex amplitude value into a real number part and an imaginary number part, and calculation parameters used to generate the projected image, are stored or transmitted.

19. An image processing apparatus for reproducing and displaying projected images stored or transmitted by the image processing apparatus of claim 18, comprising:

a processing section in which light having the same wavelength as the reference light is illuminated to the image of the real number part, and light having the same wavelength as the reference light, but phase-shifted by n/2 therefrom, is illuminated to the image of the imaginary number part, and the wave fronts of the transmitted light are respectively calculated, the value of the addition of the two transmitted light wave fronts is generated as an image, and the projected image is thus reproduced; and a processing section in which the reproduced projected image is displayed.

* * * * *